US008200841B2

(12) United States Patent
Kudo

(10) Patent No.: US 8,200,841 B2
(45) Date of Patent: Jun. 12, 2012

(54) DEVICE HAVING CAPABILITY TO SWITCH FROM TUNNELING COMMUNICATION TO P2P COMMUNICATION WITH OTHER DEVICE UNDER THE CONTROL OF NETWORK ADDRESS TRANSLATION DEVICES

(75) Inventor: Yasuhiro Kudo, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 164 days.

(21) Appl. No.: 12/857,129

(22) Filed: Aug. 16, 2010

(65) Prior Publication Data

US 2011/0066713 A1    Mar. 17, 2011

(30) Foreign Application Priority Data

Sep. 11, 2009 (JP) ................................. 2009-210379

(51) Int. Cl.
*G06F 15/173* (2006.01)
(52) U.S. Cl. .................... 709/242; 709/238; 709/239
(58) Field of Classification Search .................. 709/238, 709/239, 240, 241, 242, 243, 244, 249, 223, 709/224, 222; 380/274; 370/329, 315; 726/12, 726/15; 713/160
See application file for complete search history.

(56) References Cited

U.S. PATENT DOCUMENTS

| 7,542,466 | B2 | 6/2009 | Ikenaga et al. |
| 7,861,080 | B2 * | 12/2010 | Wakameda .................... 713/160 |
| 2008/0201486 | A1 * | 8/2008 | Hsu et al. ...................... 709/238 |
| 2009/0282470 | A1 * | 11/2009 | Yang et al. ...................... 726/12 |
| 2010/0121985 | A1 * | 5/2010 | Gotare et al. .................. 709/249 |

(Continued)

FOREIGN PATENT DOCUMENTS

EP    1 804 445 A1    7/2007

(Continued)

OTHER PUBLICATIONS

Rosenberg, J., "Interactive Connectivity Establishment (ICE): A Protocol for Network Address Translator (NAT) Traversal for Offer/Answer Protocols; draft-ietf-mmusic-ice-19," *Internet Engineering Task Force*, Oct. 29, 2007, pp. 1-119, vol. mmusic, No. 19.

(Continued)

*Primary Examiner* — Le H Luu
(74) *Attorney, Agent, or Firm* — Oliff & Berridge, PLC

(57) ABSTRACT

A terminal device includes a first communication portion that performs tunneling communication with another terminal device via a server adapted to realize tunneling communication between the terminal device and the other terminal device by encapsulating and decapsulating packets, an identification portion that identifies, by communication with a management server, type information of at least one of a NAT device that controls an internal network to which the terminal device is connected and another NAT device that controls another internal network to which the other terminal device is connected, a selection portion that selects a start-up procedure to start peer to peer communication based on the type information, a switching portion that performs communication based on the start-up procedure, starts the P2P communication, and then switches from the tunneling communication to the P2P communication by terminating the tunneling communication, and a second communication portion that performs the P2P communication after switching.

15 Claims, 18 Drawing Sheets

U.S. PATENT DOCUMENTS

| | | | |
|---|---|---|---|
| 2010/0154050 A1* | 6/2010 | Mukkara et al. | 726/15 |
| 2010/0223463 A1* | 9/2010 | Sakaguchi et al. | 713/168 |
| 2010/0226304 A1* | 9/2010 | Shoji | 370/315 |
| 2010/0235481 A1* | 9/2010 | Deutsch et al. | 709/222 |
| 2011/0047261 A1* | 2/2011 | Gobara et al. | 709/224 |
| 2011/0066713 A1* | 3/2011 | Kudo | 709/223 |
| 2011/0191467 A1* | 8/2011 | Imbimbo et al. | 709/224 |
| 2012/0008567 A1* | 1/2012 | Eisl et al. | 370/329 |
| 2012/0045060 A1* | 2/2012 | Maestrini et al. | 380/274 |

FOREIGN PATENT DOCUMENTS

| | | |
|---|---|---|
| JP | A-2005-151142 | 6/2005 |
| JP | A-2006-197182 | 7/2006 |

OTHER PUBLICATIONS

Extended European Search Report issued in European Application No. 10251448.6 on Feb. 16, 2011.

* cited by examiner

FIG. 5

| OWN NAT DEVICE \ PARTNER NAT DEVICE | NO NAT DEVICE | Full Cone NAT | Address-Restricted Cone NAT | Port-Restricted Cone NAT | Symmetric NAT |
|---|---|---|---|---|---|
| NO NAT DEVICE | — | — | — | — | — |
| Full Cone NAT | — | — | — | — | — |
| Address-Restricted Cone NAT | — | — | UDP Hole Punching | UDP Hole Punching | UDP Hole Punching |
| Port-Restricted Cone NAT | — | — | UDP Hole Punching | UDP Hole Punching | UDP Multi Hole Punching (WHEN PREDICTION IS POSSIBLE) |
| Symmetric NAT | — | — | UDP Hole Punching | UDP Multi Hole Punching (WHEN PREDICTION IS POSSIBLE) | UDP Multi Hole Punching (WHEN PREDICTION IS POSSIBLE) |

841

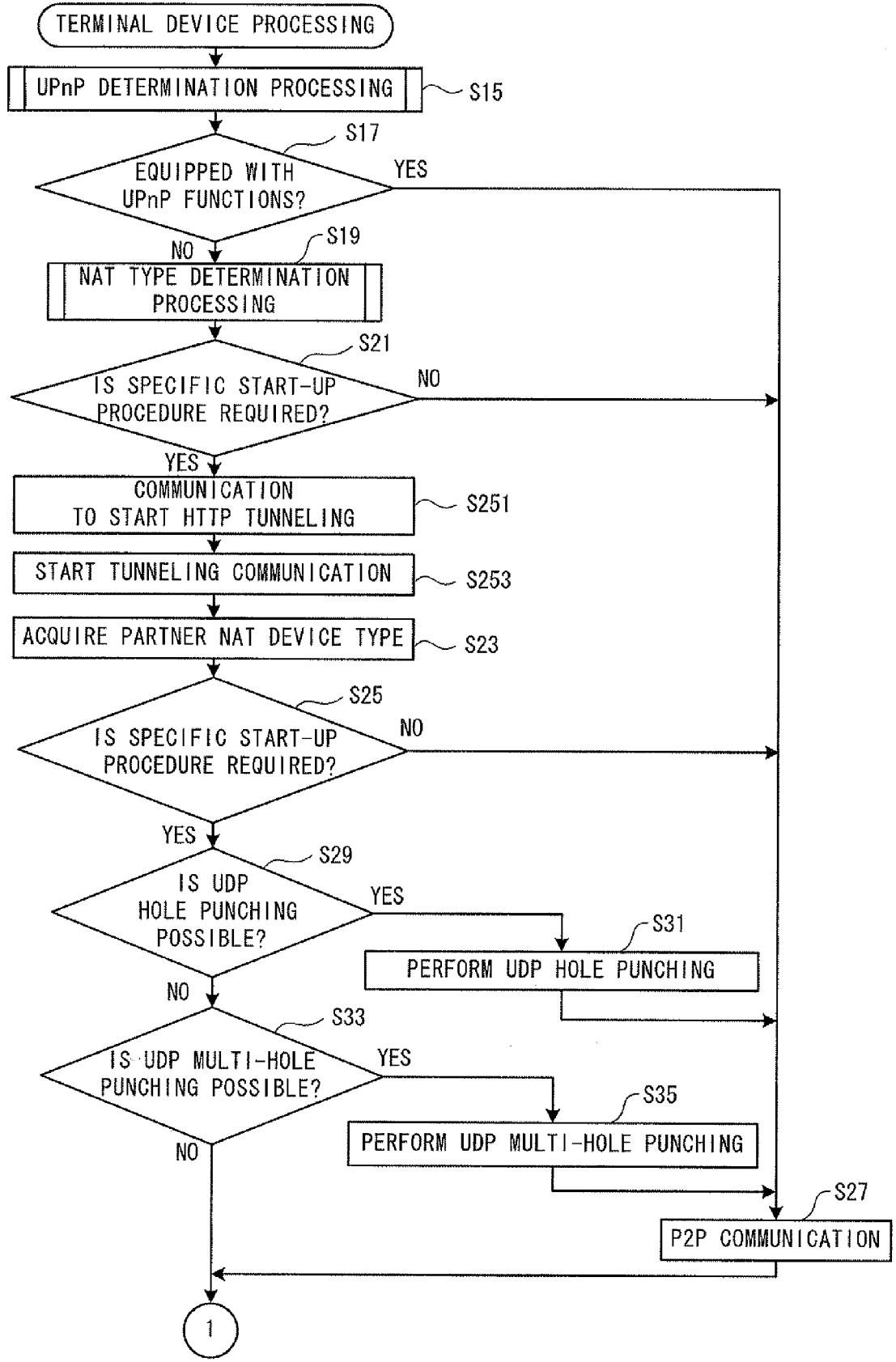

DEVICE HAVING CAPABILITY TO SWITCH FROM TUNNELING COMMUNICATION TO P2P COMMUNICATION WITH OTHER DEVICE UNDER THE CONTROL OF NETWORK ADDRESS TRANSLATION DEVICES

CROSS-REFERENCE TO RELATED APPLICATION D

This application claims priority to Japanese Patent Application No. 2009-210379, filed Sep. 11, 2009, the disclosure of which is hereby incorporated by reference in its entirety.

BACKGROUND

The present invention relates to a terminal device, a communication method and a computer-readable medium storing a communication program for communicating with another terminal device that is under control of a different network address translation (NAT) device.

Communication of video or audio between terminal devices over the Internet is sometimes performed via a device provided with a NAT function (hereinafter referred to as a NAT device). Various methods have been proposed to perform communication between terminals device that are respectively under control of different NAT devices. One such method is disclosed, for example, in which communication data is encapsulated using the HyperText Transfer Protocol (HTTP) and is transmitted by way of an HTTP tunneling server.

SUMMARY

In the method described above, it is necessary for the HTTP server to relay the audio and video in real time. As a result, there may be a high load on the server and delays are likely to occur.

Various exemplary embodiments of the general principles herein provide a terminal device, a communication method and a computer-readable medium storing a communication program that are capable of promptly starting communication between terminal devices and that are also capable of reducing the occurrence of delays during communication.

Exemplary embodiments provide a terminal device that is connected to an internal network, which is under control of a NAT device connected to an external network, and that is capable of communicating with another terminal device that is connected to another internal network, which is under control of another NAT device that is different to the NAT device. The terminal device includes a first communication portion, an identification portion, a selection portion, a switching portion, and a second communication portion. The first communication portion performs tunneling communication with the other terminal device via a server that is connected to the external network. The server is adapted to realize tunneling communication between the terminal device and the other terminal device by encapsulating and decapsulating packets based on a communication protocol by which the NAT device can transfer the packets. The identification portion identifies, by communication with a management server that is connected to the external network, type information of at least one of the NAT device and the other NAT device. The type information is classified by a port mapping method. The selection portion selects, based on the type information identified by the identification portion, from a procedure list stored in storage portion, a start-up procedure that is necessary to start peer to peer (P2P) communication between the terminal device and the other terminal device via the NAT device and the other NAT device. The switching portion performs communication based on the start-up procedure selected by the selection portion and starts the P2P communication with the other terminal device, and then switches from the tunneling communication to the P2P communication by terminating the tunneling communication being performed by the first communication portion. The second communication portion performs the P2P communication with the other terminal device after switching from the tunneling communication to the P2P communication by the switching portion.

Exemplary embodiments also provide a communication method of performing communication between a terminal device that is connected to an internal network, which is under control of a NAT device connected to an external network, and another terminal device that is connected to another internal network, which is under control of another NAT device that is different to the NAT device. The communication method includes the step of performing tunneling communication with the other terminal device via a server that is connected to the external network. The server is adapted to realize tunneling communication between the terminal device and the other terminal device by encapsulating and decapsulating packets based on a communication protocol by which the NAT device can transfer the packets. The communication method also includes the step of identifying, by communication with a management server that is connected to the external network, type information of at least one of the NAT device and the other NAT device. The type information is classified by a port mapping method. The communication method further includes the step of selecting, based on the identified type information, from a procedure list stored in a storage portion, a start-up procedure that is necessary to start peer to peer (P2P) communication between the terminal device and the other terminal device via the NAT device and the other NAT device. The communication method further includes the step of performing communication based on the selected start-up procedure and starting the P2P communication with the other terminal device, and then switching from the tunneling communication to the P2P communication by terminating the tunneling communication. The communication method still further includes the step of performing the P2P communication with the other terminal device after switching from the tunneling communication to the P2P communication.

Exemplary embodiments further provide a computer-readable medium storing a communication program for performing communication between a terminal device that is connected to an internal network, which is under control of a NAT device connected to an external network and another terminal device that is connected to another internal network, which is under control of another NAT device that is different to the NAT device. The communication program includes instructions that cause a controller of the terminal device to perform the step of performing tunneling communication with the other terminal device via a server that is connected to the external network. The server is adapted to realize tunneling communication between the terminal device and the other terminal device by encapsulating and decapsulating packets based on a communication protocol by which the NAT device can transfer the packets. The communication program further includes instructions that cause the controller to perform the step of identifying, by communication with a management server that is connected to the external network, type information of at least one of the NAT device and the other NAT device. The type information is classified by a port mapping method. The communication program further includes instructions that cause the controller to perform the step of selecting, based on the identified type information, from a procedure list stored in a storage portion, a start-up procedure that is necessary to start peer to peer (P2P) communication between the terminal device and the other terminal device via the NAT device and the other NAT device. The communication program further includes instructions that cause the controller to perform the step of performing communication based on the selected start-up procedure and starting the P2P communication with the other terminal device, and then switching from the tunneling communication to the P2P communication by terminating the tunneling communication. The communication program still further includes instructions that cause the controller to perform the step of performing the P2P communication with the other terminal device after switching from the tunneling communication to the P2P communication.

BRIEF DESCRIPTION OF THE DRAWINGS

Exemplary embodiments will be described below in detail with reference to the accompanying drawings in which:

FIG. 5 is a schematic diagram showing a procedure list 841;

FIG. 18 is a flowchart showing a modified example of the terminal device processing.

DETAILED DESCRIPTION

Figure 1:
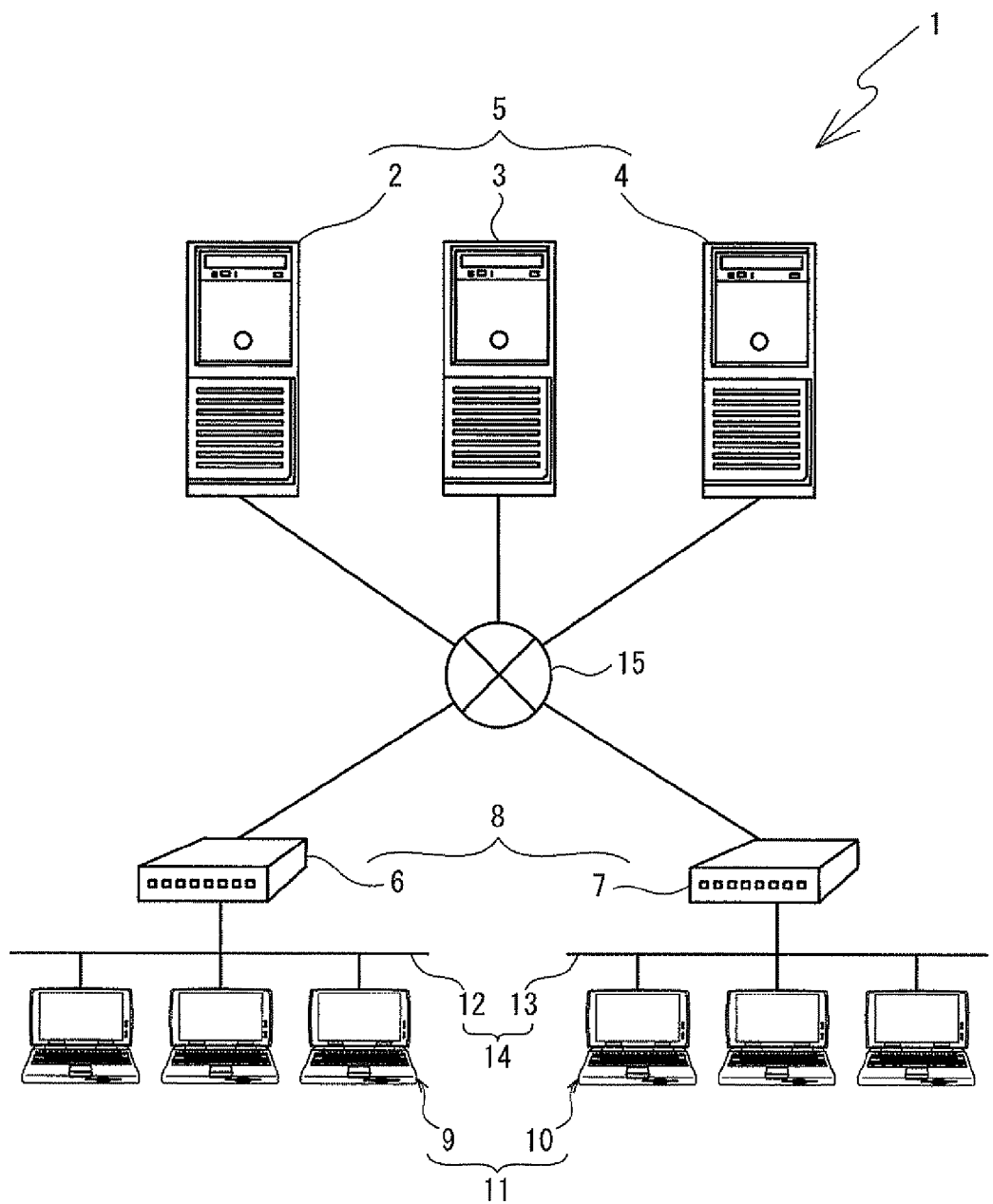
FIG. 1 is a schematic diagram showing an overview of a communication system 1.

Hereinafter, a communication system 1 according to the present invention will be explained with reference to the drawings. As shown in FIG. 1, the communication system 1 includes a Simple Traversal of UDP through NATs (STUN) server 2, a Session Initiation Protocol (SIP) server 3, an HTTP server 4, a NAT device 6, a NAT device 7, a terminal device 9 and a terminal device 10. Hereinafter, when the STUN server 2, the SIP server 3 and the HTTP server 4 are collectively referred to, or when no distinction is made between the servers 2, 3 and 4, they are referred to as "server 5" or "servers 5". When the NAT devices 6 and 7 are collectively referred to, or when no distinction is made between the NAT devices 6 and 7, they are referred to as a "NAT device 8" or "NAT devices 8." When the terminal devices 9 and 10 are collectively referred to, or when no distinction is made between the terminal devices 9 and 10, they are referred to as "terminal device 11" or "terminal devices 11." The servers 5 and the NAT devices 8 are respectively connected to the Internet 15. The NAT devices 6 and 7 are respectively connected to a subordinate local area network (LAN) 12 and a subordinate LAN 13. Hereinafter, when the LAN 12 and the LAN 13 are collectively referred to, or when no distinction is made between the LAN 12 and the LAN 13, they are referred to as a "LAN 14" or "LANs 14." The terminal devices 11 are respectively connected to the LANs 14. In the example shown in FIG. 1, the terminal device 9 is connected to the LAN 12 that is under control of the NAT device 6. The terminal device 10 is connected to the LAN 13 that is under control of the NAT device 7.

Through performing communication with the terminal devices 11, the STUN server 2 provides the terminal devices 11 with necessary information to perform Peer to Peer (P2P) communication between the terminal devices 11. Based on SIP, the SIP server 3 performs call control between the terminal devices 11. By transferring HTTP based packets, the HTTP server 4 controls distribution of Web information to the terminal devices 11. By encapsulating the packets using HTTP, the HTTP server 4 realizes tunneling communication between the terminal devices 11. The terminal device 11 performs tunneling communication with the other terminal device 11 via the HTTP server 4. The terminal device 11 performs P2P communication with the other terminal device 11. The terminal device 11 may be, for example, a personal computer. The NAT device 8 is a device that is provided with a NAT function.

The NAT devices 8 can be classified into four types, that is, a Full Cone NAT, an Address-Restricted Cone NAT, a Port-Restricted Cone NAT and a Symmetric NAT, depending on an IP address and a method to convert a port number, namely, depending on a port mapping method. To resolve the so-called "NAT traversal problem" and enable P2P communication between the terminal devices 11, an optimum start-up procedure (UPnP, user datagram protocol (UDP) hole punching, UDP multi hole punching, for example) should be selected for each of the above-described NAT classifications (hereinafter referred to as a "NAT type"), and communication based on the selected start-up procedure should be performed.

In the present embodiment, tunneling communication is performed between the terminal devices 11 via the HTTP server 4 in parallel with identifying the NAT types of the NAT devices 8 and executing the start-up procedure. Normally, communication via the HTTP server 4 is allowed between unidentified terminal devices 11, and packets transferred via the HTTP server 4 are not blocked by the NAT devices 8. As a consequence, by performing tunneling communication via the HTTP server 4, the communication between the terminal devices 11 can be started promptly. After the NAT types of the NAT devices 8 are identified and communication is performed based on the start-up procedure, a state is achieved in which P2P communication can be performed between the terminal devices 11. In this case, the tunneling communication via the HTTP server 4 is stopped, and P2P communication between the terminal devices 11 is performed instead. In the P2P communication, communication is performed without going via a server etc., and communication delays etc. can therefore be resolved.

Figure 2:
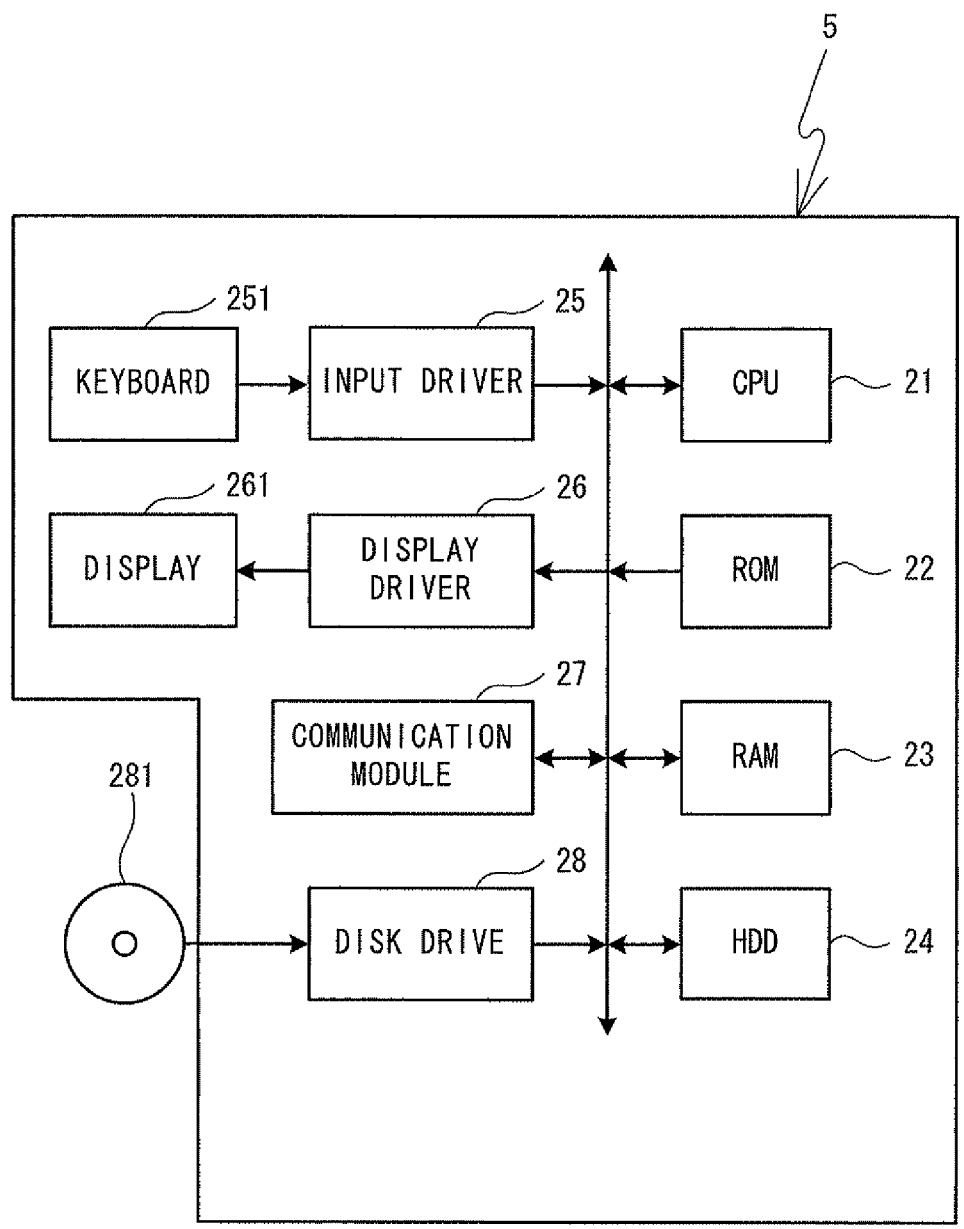
FIG. 2 is a block diagram showing an electrical configuration of a server 5.

As shown in FIG. 2, the server 5 includes a CPU 21, a ROM 22, a RAM 23 and an HDD 24. The CPU 21 controls communication with the NAT devices 8 and the terminal devices 11. At least a boot program and default parameters are stored in the ROM 22. At least data generated during processing by the CPU 21 may be temporarily stored in the RAM 23. At least a program to be executed by the CPU 21 is stored in the HDD 24. The CPU 21 is electrically connected to the ROM 22, the RAM 23 and the HDD 24. The CPU 21 can access storage areas of the ROM 22, the RAM 23 and the HDD 24.

The server 5 includes an input driver 25. The input driver 25 detects information that is input via a keyboard 251. The CPU 21 is electrically connected to the input driver 25. The input driver 25 is electrically connected to the keyboard 251. The CPU 21 can recognize the information that is input via the keyboard 251. The server 5 includes a display driver 26. The display driver 26 performs control to display images on a display 261. The CPU 21 is electrically connected to the display driver 26. The display driver 26 is electrically connected to the display 261. The CPU 21 can cause a desired image to be displayed on the display 261.

The server 5 includes a communication module 27. The communication module 27 enables communication via the Internet 15. The CPU 21 is electrically connected to the communication module 27. The CPU 21 can perform communication via the Internet 15. The server 5 is provided with a disk drive 28. The disk drive 28 is a drive device to access information stored in a recording medium 281. The CPU 21 is electrically connected to the disk drive 28. When the recording medium 281 is inserted in the disk drive 28, the CPU 21 can access the information stored in the recording medium 281. The program to be executed by the CPU 21, for example, may be stored in the recording medium 281. When the server 5 is set up, the program may be installed from the recording medium 281 to the HDD 24.

Figure 3:
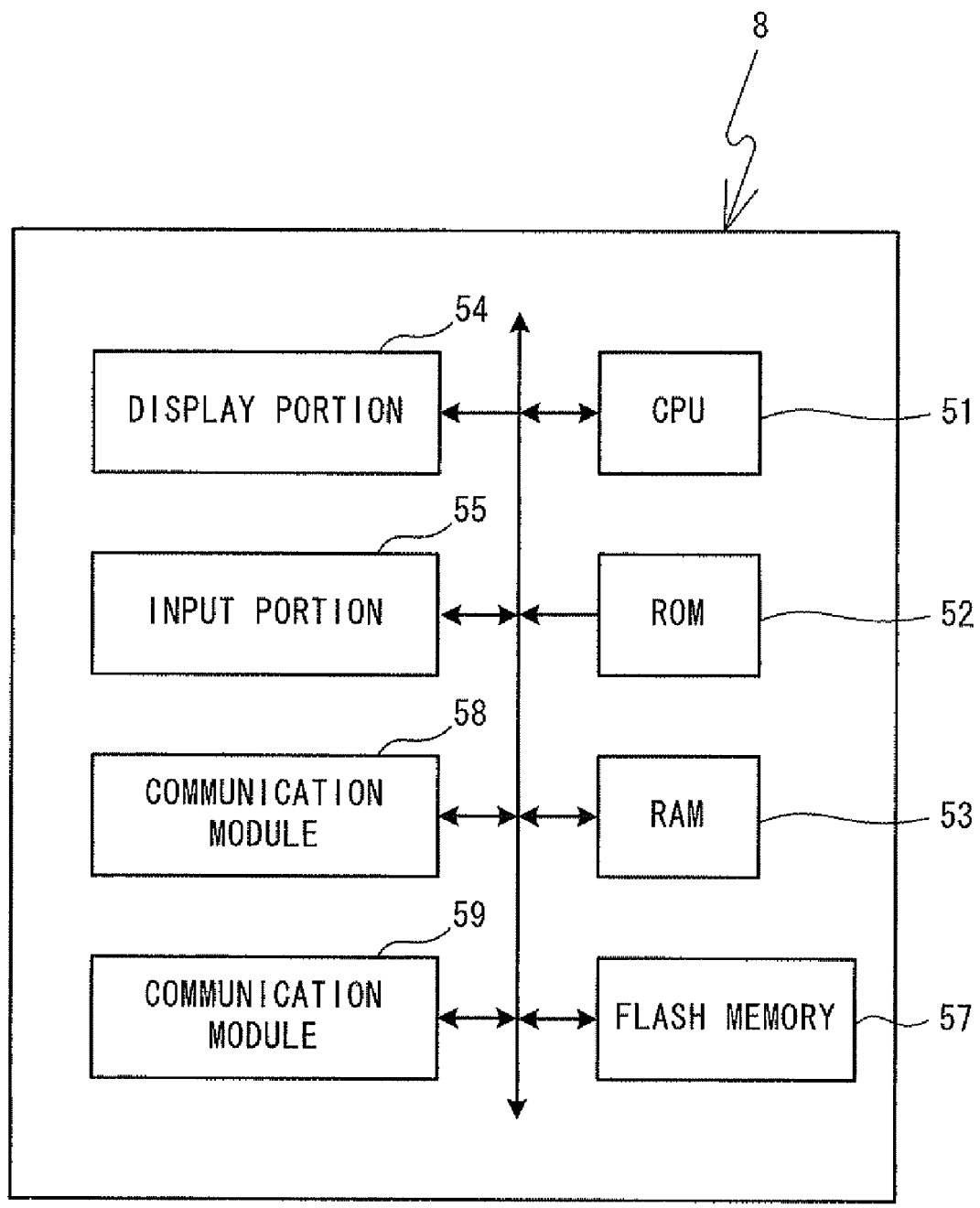
FIG. 3 is a block diagram showing an electrical configuration of a NAT device 8.

As shown in FIG. 3, the NAT device 8 includes a CPU 51, a ROM 52, a RAM 53 and a flash memory 57. The CPU 51 controls communication with the servers 5 and the terminal devices 11. At least a program to be executed by the CPU 51 is stored in the ROM 52. At least data generated during processing by the CPU 51 may be temporarily stored in the RAM 53. A port number may be stored in the flash memory 57 as log information. The CPU 51, the ROM 52, the RAM 53 and the flash memory 57 are electrically connected. The CPU 51 can access storage areas of the ROM 52, the RAM 53 and the flash memory 57.

The NAT device 8 is provided with a display portion 54. The display portion 54 can display a status of the NAT device 8 etc. The CPU 51 is electrically connected to the display portion 54. The CPU 51 can cause desired information to be displayed on the display portion 54. An LED can be used as the display portion 54, for example. The NAT device 8 includes an input portion 55. The input portion 55 receives an input operation to the NAT device 8 by a user. The CPU 51 is electrically connected to the input portion 55. The CPU 51 recognizes information input via the input portion 55. A switch or a touch sensor, for example, can be used as the input portion 55.

The NAT device 8 includes a communication module 58. The communication module 58 enables communication via the Internet 15. The CPU 51 is electrically connected to the communication module 58. The CPU 51 can perform communication via the Internet 15. The NAT device 8 includes a communication module 59. The communication module 59 enables communication via the LANs 14. The CPU 51 is electrically connected to the communication module 59. The CPU 51 can perform communication via the LANs 14.

Figure 4:
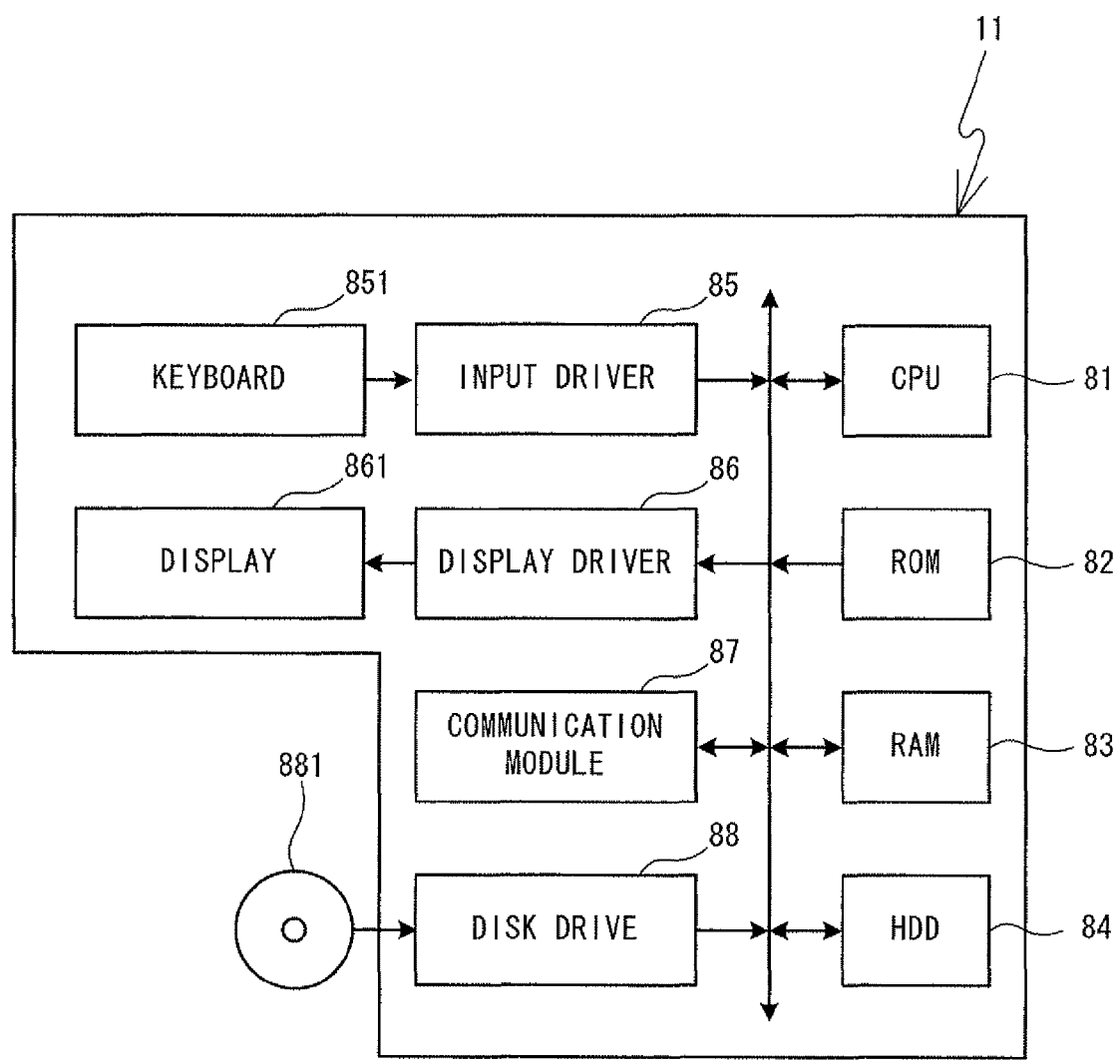
FIG. 4 is a block diagram showing an electrical configuration of a terminal device 11.

As shown in FIG. 4, the terminal device 11 includes a CPU 81, a ROM 82, a RAM 83 and an HDD 84. The CPU 81 controls communication with the NAT devices 8 and the servers 5. At least a boot program and default parameters are stored in the ROM 82. At least data generated during processing by the CPU 81 may be temporarily stored in the RAM 83. At least a program to be executed by the CPU 81 and a list for a start-up procedure (hereinafter referred to as a "procedure list") are stored in the HDD 84. The procedure list may be used when causing P2P communication between the terminal devices 11 to start. The CPU 81 is electrically connected to the ROM 82, the RAM 83 and the HDD 84. The CPU 81 can access storage areas of the ROM 82, the RAM 83 and the HDD 84.

The terminal device 11 includes an input driver 85. The input driver 85 detects information that is input via a keyboard 851. The CPU 81 is electrically connected to the input driver 85. The input driver 85 is electrically connected to the keyboard 851. The CPU 81 can recognize the information that is input via the keyboard 851. The terminal device 11 is provided with a display driver 86. The display driver 86 performs control to display images on a display 861. The CPU 81 is electrically connected to the display driver 86. The display driver 86 is electrically connected to the display 861. The CPU 81 can cause a desired image to be displayed on the display 861.

The terminal device 11 includes a communication module 87. The communication module 87 enables communication via the LANs 14. The CPU 81 is electrically connected to the communication module 87. The CPU 81 can perform communication via the LANs 14. The terminal device 11 includes a disk drive 88. The disk drive 88 is a drive device to access information stored in a recording medium 881. The CPU 81 is electrically connected to the disk drive 88. When the recording medium 881 is inserted in the disk drive 88, the CPU 81 can access the information stored in the recording medium 881. The program to be executed by the CPU 81, for example, may be stored in the recording medium 881. When the terminal device 11 is set up, the program may be installed from the recording medium 881 to the HDD 84.

A procedure list 841, which is an example of the procedure list stored in the HDD 84, will be explained with reference to FIG. 5. Start-up procedures are defined in the procedure list 841. Each of the start-up procedures corresponds to a combination of the NAT type of the NAT device 8 (hereinafter referred to as an "own NAT device") that is directly connected to the terminal device 11 via the LAN 14, and of the NAT type of the NAT device 8 (hereinafter sometimes referred to as a "partner NAT device") that is directly connected to the partner terminal device 11, that is, a partner in performing P2P communication, via the LAN 14. In terminal device processing to be explained later, the start-up procedure is determined based on the procedure list.

For example, when the type of either one of the own NAT device and the partner NAT device is one of "no NAT device" and "Full Cone NAT", it is defined that no start-up procedure is necessary. Further, when both of the NAT types are either one of "Address-Restricted Cone NAT" and "Port-Restricted Cone NAT", UDP hole punching is defined as the start-up procedure. In addition, when both of the NAT types are "Symmetric NAT", UDP multi-hole punching is defined as the start-up procedure (only in a case in which a change pattern of the port number can be predicted). Details of how the procedure list is used will be explained later.

Terminal device processing shown in FIG. 6 to FIG. 14 is started and executed by the CPU 81 when a command is input by the user via the keyboard 851 for the terminal device 11 to perform communication with another terminal device 11. In the following explanation, terminal device processing is described in which the terminal device 9 performs P2P communication with the terminal device 10 and the terminal device processing is executed by the CPU 81 of the terminal device 9.

Figure 6:
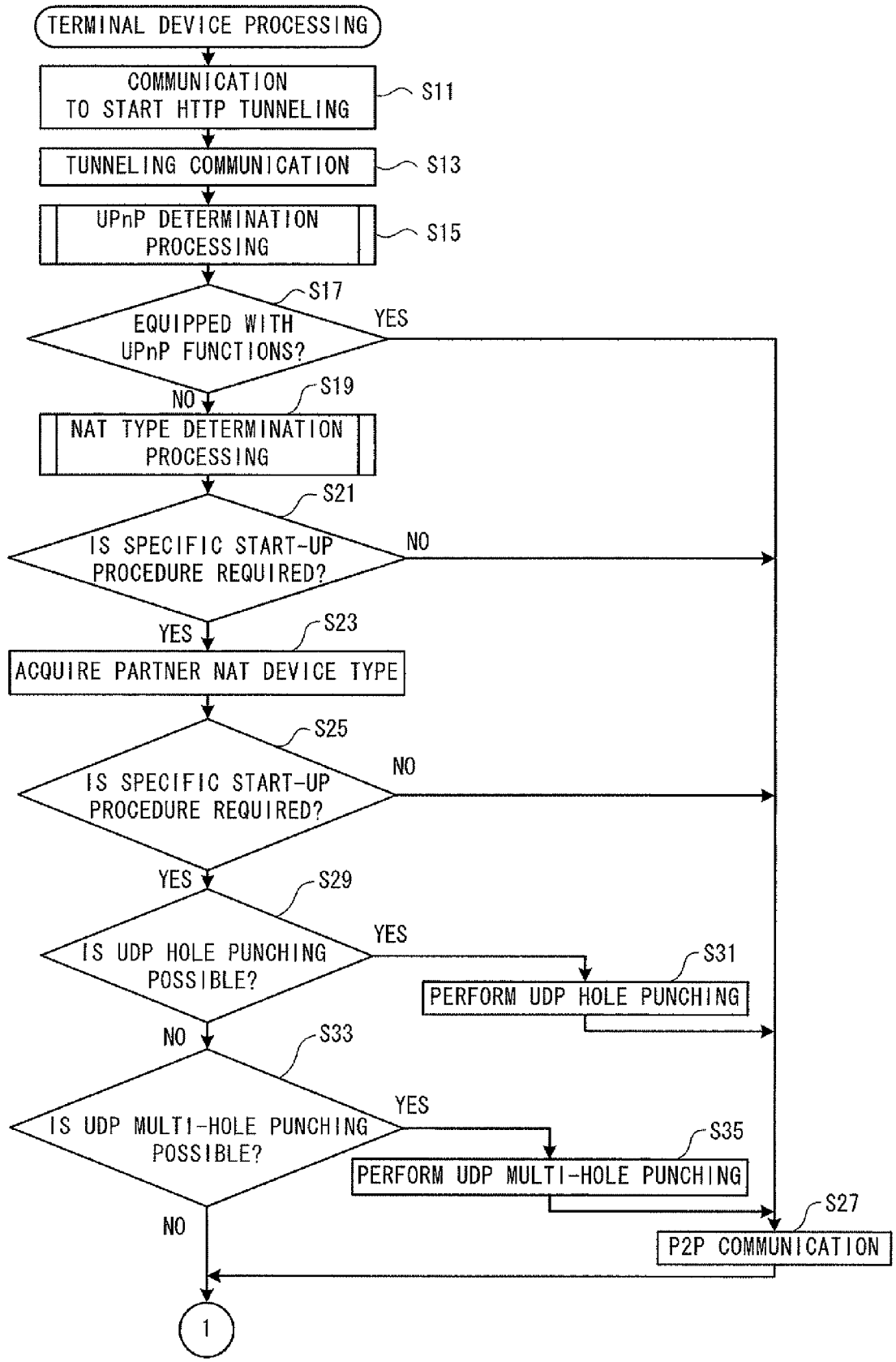
FIG. 6 is a flowchart showing terminal device processing.

As shown in FIG. 6, when the terminal device processing is started, communication is performed in order to start tunneling communication with the terminal device 10 via the HTTP server 4 (step S11). The terminal device 9 can then perform tunneling communication with the terminal device 10. In tunneling communication, packets are encapsulated in HTTP by the HTTP server 4. The HTTP-encapsulated packets reach the terminal devices 9 and 10 without being blocked by the NAT devices 6 and 7.

In a state in which tunneling communication is enabled, SIP-based call control communication with the terminal device 10 is performed by the terminal device 9. In this way, the terminal device 9 enters a connected state to the terminal device 10. Transmission and reception of Real-time Transport Protocol (RTP)-based packets is started between the terminal device 9 and the terminal device 10 that are in the connected state (step S13). In the present embodiment, it is assumed that video image data are transmitted and received between the terminal devices 9 and 10. The video image data are packetized by the terminal device 10, and the terminal device 9 receives video packets transmitted from the terminal device 10.

UPnP determination processing is performed to determine whether the NAT device 6 and the NAT device 7 are each equipped with UPnP functions (step S15). The UPnP determination processing will be explained with reference to FIG. 8. Search packets to search for a NAT device 8 that is equipped with UPnP functions are transmitted by multicast (step S61). When the NAT device 8 equipped with UPnP functions receives the search packet, the NAT device 8 returns a response packet. On the terminal device 9, a determination is made as to whether response packets in response to the search packets have been received (step S63). In a case where the response packets have not been received from both the NAT device 6 and the NAT device 7 (no at step S63), at least one of the NAT device 6 and the NAT device 7 is not equipped with UPnP functions. In this case, the CPU 81 terminates the UPnP determination processing and returns to the terminal device processing shown in FIG. 6.

In a case where the response packets have been received from both the NAT device 6 and the NAT device 7 (yes at step S63), the NAT device 6 and the NAT device 7 are both equipped with UPnP functions. Then a request packet is transmitted to each of the NAT device 6 and the NAT device 7 (step S65). The request packet requests an IP address and a port number allocated on the Internet 15 side. In response to the request packet, the NAT device 6 and the NAT device 7 each return a response packet to which is added the IP address and the port number. On the terminal device 9, a determination is made as to whether the response packets have been received (step S67). In a case where the response packet has not been received from at least one of the NAT device 6 and the NAT device 7 (no at step S67), UPnP-based communication cannot be performed via the NAT device 6 and the NAT device 7. In this case, the CPU 81 terminates the UPnP determination processing and returns to the terminal device processing shown in FIG. 6.

In a case where the response packets in response to the request packets have been received from both the NAT device 6 and the NAT device 7 (yes at step S67), the terminal device 9 can perform UPnP-based communication with the terminal device 10. In this case, the terminal device 9 and the terminal device 10 can perform mutual P2P communication without going through any specific start-up procedure. Flag information indicating that the UPnP-based communication can be performed is temporarily stored in the RAM 83 (step S69). The CPU 81 terminates the UPnP determination processing and returns to the terminal device processing shown in FIG. 6.

As shown in FIG. 6, following the UPnP determination processing (step S15), the flag information stored in the RAM 83 is referred to and a determination is made as to whether UPnP-based communication can be performed with the terminal device 10 (step S17). In a case where UPnP-based communication can be performed with the terminal device 10 (yes at step S17), communication based on the specific start-up procedure is not necessary. Namely, the terminal device 9 is in a state in which the terminal device 9 can start P2P communication with the terminal device 10. Accordingly, by P2P communication, packets including video image data are transmitted and received between the terminal devices 9 and 10 (step S27). The CPU 81 advances to processing at step S37 shown in FIG. 7.

In a case where the UPnP-based communication cannot be performed between the terminal devices 9 and 10 (no at step S17), NAT type determination processing is performed (step S19). In the NAT type determination processing, the NAT type of the NAT device 6 is identified through a predetermined communication by the terminal device 9 with the STUN server 2.

Figure 9:
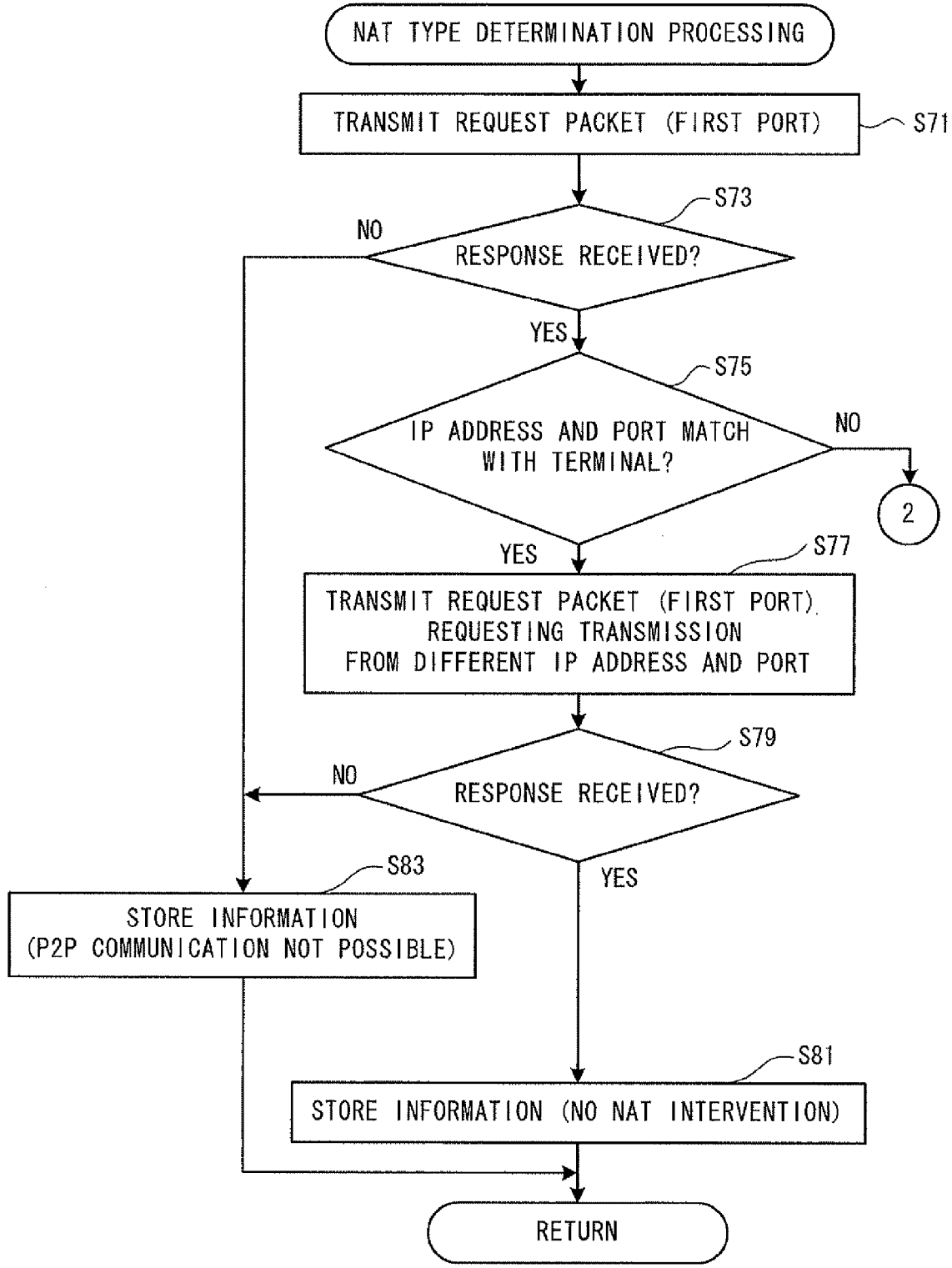
FIG. 9 is a flowchart showing NAT type determination processing.

The NAT type determination processing will be explained with reference to FIGS. 9 and 10. A request packet is transmitted to the STUN server 2, requesting a response packet to be returned to the terminal device 9. The request packet is transmitted to a port (a first port) of the STUN server 2 (step S71). A determination is made as to whether the response packet has been received (step S73). In a case where the response packet has not been received (no at step S73), the terminal device 9 cannot perform P2P communication with the terminal device 10. Thus, flag information indicating that P2P communication cannot be performed is temporarily stored in the RAM 83 (step S83). The CPU 81 terminates the NAT type determination processing and returns to the terminal device processing shown in FIG. 6.

In a case where the response packet has been received from the STUN server 2 (yes at step S73), the IP address and the port number included in the received response packet are extracted from the response packet. The IP address and the port number included in the received response packet are the IP address and the port number of the NAT device 6 on the Internet 15 side (hereinafter sometimes referred to as a "NAT IP" and a "NAT port", respectively). A determination is made as to whether a transmission source IP address that is used when the terminal device 9 transmits the request packet matches the NAT IP, and also whether a transmission source port number that is used when the terminal device 9 transmits the request packet matches the NAT port (step S75). In a case where the transmission source IP address and the NAT IP do not match and/or in a case where the transmission source port number and the NAT port do not match (no at step S75), this indicates that the NAT device 6 is located between the terminal device 9 and the STUN server 2. In this case, the CPU 81 advances to processing at step S85 shown in FIG. 10.

In a case where the transmission source IP address and the NAT IP match and the transmission source port number and the NAT port also match (yes at step S75), a request packet, which requests that a response packet be returned to the terminal device 9, is transmitted to the first port of the STUN server 2 (step S77). The request packet that is transmitted at step S77 requests, to the STUN server 2, that the response packet be transmitted from another transmission source IP address and another transmission source port number that are different from those of the response packet returned in response to the request packet transmitted at step S71. A determination is made as to whether the response packet has been received (step S79). In a case where the response packet has not been received (no at step S79), the terminal device 9 cannot perform P2P communication with the terminal device 10. Therefore, flag information indicating that the P2P communication cannot be performed is temporarily stored in the RAM 83 (step S83). The CPU 81 terminates the NAT type determination processing and returns to the terminal device processing shown in FIG. 6.

In a case where the response packet has been received from the STUN server 2 (yes at step S79), the NAT device 6 is not located between the terminal device 9 and the STUN server 2. Therefore, the terminal device 9 can perform P2P communication with the terminal device 10 without going through any specific start-up procedure. Flag information indicating that there is no intervention by the NAT device 6 is temporarily stored in the RAM 83 (step S81). The CPU 81 terminates the NAT type determination processing and returns to the terminal device processing shown in FIG. 6.

Figure 10:
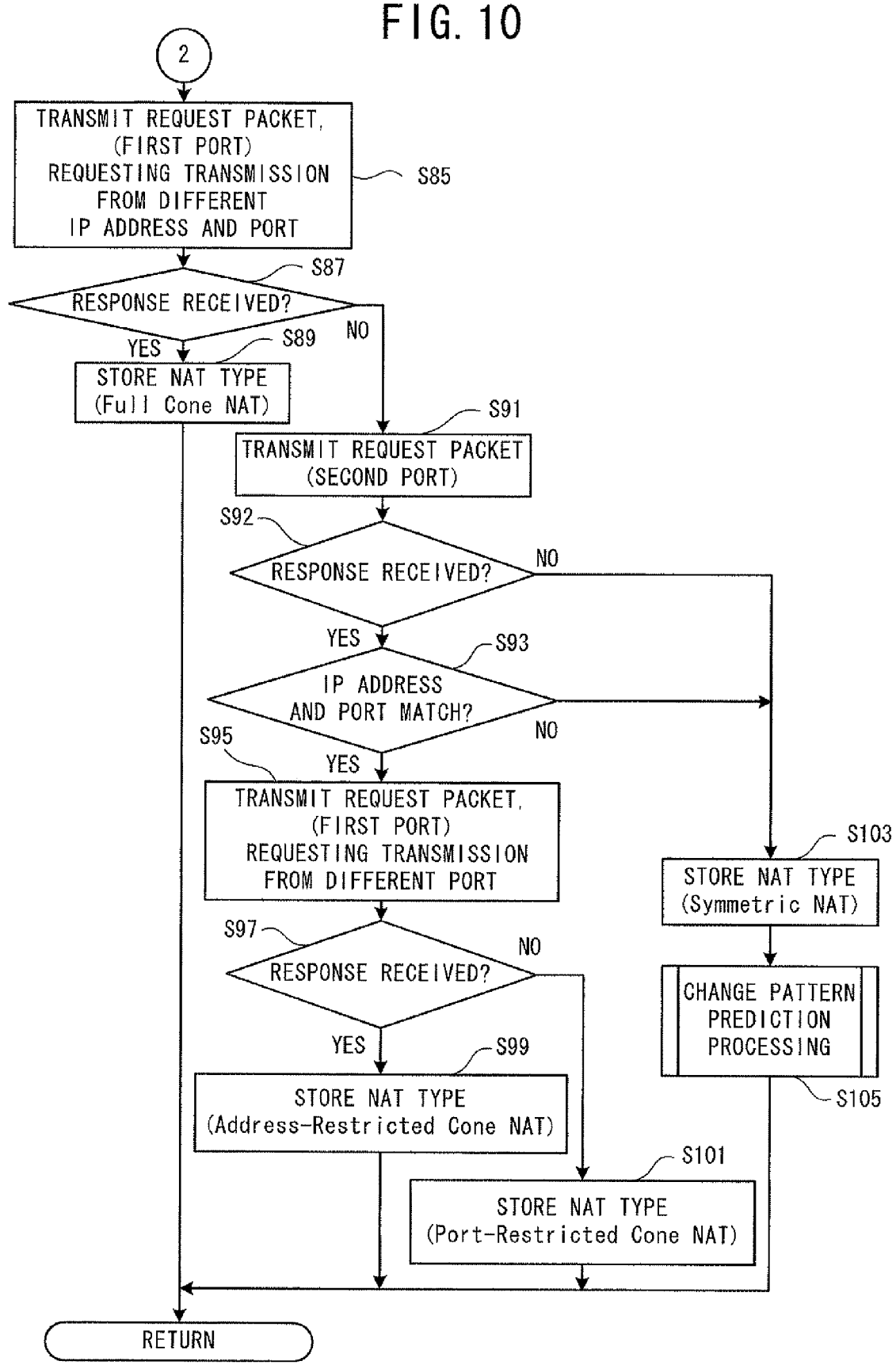
FIG. 10 is a flowchart showing the NAT type determination processing and is a continuation of FIG. 9.

In processing at step S85 shown in FIG. 10, a request packet requesting that a response packet be returned to the terminal device 9 is transmitted to a first port of the STUN server 2. The request packet that is transmitted at step S85 requests, to the STUN server 2, that the response packet be transmitted from another transmission source IP address and another transmission source port number that are different from those of the response packet returned in response to the request packet transmitted at step S71. A determination is made as to whether the response packet has been received (step S87). In a case where the response packet has been received (yes at step S87), the NAT type of the NAT device 6 that is located between the terminal device 9 and the STUN server 2 is identified as being Full Cone NAT. This is because both of the response packets with the different transmission source IP addresses and transmission source port numbers are transferred by the NAT device 6. Flag information indicating the NAT type, namely indicating Full Cone NAT, is temporarily stored in the RAM 83 (step S89). The CPU 81 terminates the NAT type determination processing and returns to the terminal device processing shown in FIG. 6.

In a case where the response packet has not been received (no at step S87), a request packet requesting that a response packet be returned to the terminal device 9 is transmitted to a port (a second port) of the STUN server 2 that has a different port number to the first port (step S91). A determination is made as to whether the response packet has been received (step S92). In a case where the response packet has been received (yes at step S92), the NAT IP and the NAT port included in the response packet received at step S73 (shown in FIG. 9) are compared with the NAT IP and the NAT port included in the response packet received at step S92 (step S93). In a case where the NAT IPs match and the NAT ports also match (yes at step S93), a request packet requesting that a response packet be returned to the terminal device 9 is transmitted to the first port of the STUN server 2 (step S95). The request packet transmitted at step S95 requests, to the STUN server 2, that the response packet be transmitted from the same transmission source IP address and a different port number as the response packet received at step S92. A determination is made as to whether the response packet has been received (step S97). In a case where the response packet has been received (yes at step S97), the NAT type of the NAT device 6 is identified as being Address-Restricted Cone NAT. This is because the NAT device 6 transfers the response packet even when the transmission source port number is different. Flag information indicating the NAT type, namely indicating Address-Restricted Cone NAT, is temporarily stored in the RAM 83 (step S99). The CPU 81 terminates the NAT type determination processing and returns to the terminal device processing shown in FIG. 6. In a case where the response packet has not been received (no at step S97), the NAT type of the NAT device 6 is identified as being Port-Restricted Cone NAT. This is because the NAT device 6 does not transfer the response packet when the transmission source port number is different. Flag information indicating the NAT type, namely indicating Port-Restricted Cone NAT, is temporarily stored in the RAM 83 (step S101). The CPU 81 terminates the NAT type determination processing and returns to the terminal device processing shown in FIG. 6.

In a case where the response packet is not received in the processing at step S92 (no at step S92), and in a case where it is determined in the processing at step S93 that the IP addresses do not match and the port numbers do not match, or that either the IP addresses do not match or the port numbers do not match (no at step S93), the NAT type of the NAT device 6 is identified as being Symmetric NAT. Flag information indicating the NAT type, namely indicating Symmetric NAT, is temporarily stored in the RAM 83 (step S103). Then change pattern prediction processing (step S105) is performed to predict a change pattern of the port number when port mapping is performed in the NAT device 6. After performing the change pattern prediction processing, the CPU 81 terminates the NAT type determination processing and returns to the terminal device processing shown in FIG. 6.

Figure 11:
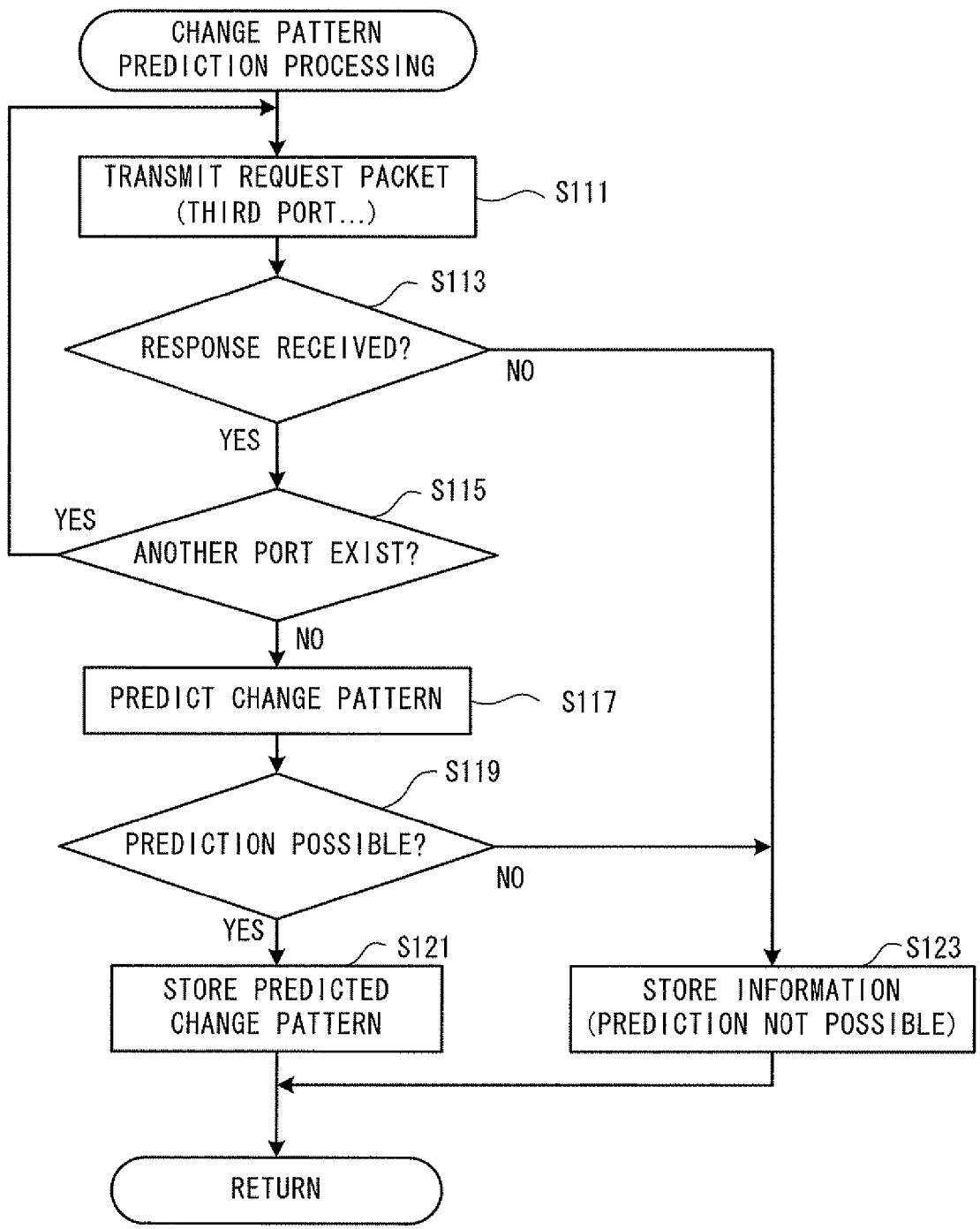
FIG. 11 is a flowchart showing change pattern prediction processing.

The change pattern prediction processing will be explained with reference to FIG. 11. A request packet, which requests that a response packet be transmitted to the terminal device 9, is transmitted to a port (a third port) of the STUN server 2 that has a different port number to the first port and the second port (step S111). A determination is made as to whether the response packet has been received (step S113). In a case where the response packet has not been received (no at step S113), the CPU 81 cannot predict the change pattern. Therefore, flag information indicating that the change pattern cannot be predicted is temporarily stored in the RAM 83 (step S123). The CPU 81 terminates the change pattern prediction processing and returns to the NAT type determination processing shown in FIG. 10.

In a case where the response packet has been received (yes at step S113), a determination is made as to whether the STUN server 2 is equipped with another port with a port number other than the first port, the second port and the third port (step S115). In a case where the STUN server 2 is equipped with a port with a port number other than the first port, the second port and the third port (yes at step S115), the CPU 81 returns to the processing at step S111. The above-described processing is repeated to transmit a request packet to a port with a port number that has not yet been used.

In a case where request packets have been transmitted to all the ports provided to the STUN server 2 (no at step S115), the change pattern is predicted from changes in the NAT IPs and the NAT ports included in the received response packets (step S117). For example, in a case where the port number has been increased by a predetermined port width, it is determined that the change pattern can be predicted. In a case where the change pattern can be predicted (yes at step S119), information indicating the predicted change pattern is temporarily stored in the RAM 83 (step S121). The CPU 81 terminates the change pattern prediction processing and returns to the NAT type determination processing shown in FIG. 10. In a case where, for example, the port number changes in a random manner, it is determined that the change pattern cannot be predicted (no at step S119) and information indicating that the change pattern cannot be predicted is temporarily stored in the RAM 83 (step S123). The CPU 81 terminates the change pattern prediction processing and returns to the NAT type determination processing shown in FIG. 10.

As shown in FIG. 6, following the NAT type determination processing (step S19), the NAT type of the NAT device 6 stored in the RAM 83 and the procedure list stored in the HDD 84 are referred to, and a determination is made as to whether a specific start-up procedure is necessary (step S21). More specifically, a determination is made as to whether one of condition (1) and condition (2) below is satisfied.

(1) There is no NAT device 6 between the terminal device 9 and the STUN server 2.
(2) The NAT type of the NAT device 6 is Full Cone NAT. In a case where one of condition (1) and condition (2) is satisfied, P2P communication can be performed between the terminal device 9 and the terminal device 10 without performing communication based on a specific start-up procedure (no at step S21). Accordingly, by P2P communication, video image data are transmitted and received between the terminal device 9 and the terminal device 10 (step S27). The CPU 81 advances to processing at step S37 shown in FIG. 7.

In a case where neither condition (1) nor condition (2) is satisfied, it is determined that a specific start-up procedure is necessary (yes at step S21). In this case, communication is performed with the STUN server 2 in order to acquire the NAT type of the NAT device 7 that is connected to the terminal device 10. The NAT type of the NAT device 7 is acquired (step S23). Based on the acquired NAT type of the NAT device 7 and on the procedure list, a determination is made as to whether the specific start-up procedure is necessary (step S25). More specifically, a determination is made as to whether one of condition (3) and condition (4) below is satisfied.

(3) There is no NAT device 7 between the terminal device 10 and the STUN server 2.
(4) The NAT type of the NAT device 7 is Full Cone NAT. In a case where one of condition (3) and condition (4) is satisfied, P2P communication can be performed between the terminal device 9 and the terminal device 10 without performing communication based on a specific start-up procedure (no at step S25). Accordingly, by P2P communication, video image data are transmitted and received between the terminal device 9 and the terminal device 10 (step S27). The CPU 81 advances to the processing at step S37 shown in FIG. 7.

In a case where neither condition (3) nor condition (4) is satisfied, it is determined that a specific start-up procedure is necessary (yes at step S25). In this case, a determination is made as to whether UDP hole punching is possible (step S29). More specifically, based on the NAT types of the NAT device 6 and the NAT device 7 and on the procedure list, a determination is made as to whether any one of condition (5), condition (6), and condition (7) below is satisfied.

(5) The NAT type of the NAT device 7 is Address-Restricted Cone NAT.
(6) The NAT type of the NAT device 7 is Port-Restricted Cone NAT and the NAT type of the NAT device 6 is one of Address-Restricted Cone NAT and Port-Restricted Cone NAT.
(7) The NAT type of the NAT device 7 is Symmetric NAT and the NAT type of the NAT device 6 is Address-Restricted Cone NAT.

In a case where one of the conditions (5) to (7) is satisfied, it is determined that UDP hole punching is possible (yes at step S29), and UDP hole punching is selected as the start-up procedure. Communication is performed based on UDP hole punching (step S31), and P2P communication is thus made possible between the terminal device 9 and the terminal device 10. By P2P communication, video image data are transmitted and received between the terminal device 9 and the terminal device 10 (step S27). The CPU 81 advances to the processing at step S37 shown in FIG. 7.

In a case where none of the conditions (5) to (7) is satisfied, it is determined that UDP hole punching is not possible (no at step S29). In this case, a determination is made as to whether UDP multi-hole punching is possible (step S33). More specifically, based on the NAT types of the NAT device 6 and the NAT device 7, on prediction results of the change pattern prediction processing shown in FIG. 11 and on the procedure list, a determination is made as to whether one of condition (8) and condition (9) below is satisfied and it is also determined as to whether the change pattern of port mapping on the terminal device 9 and the terminal device 10 can be predicted.

(8) The NAT type of the NAT device 7 is Symmetric NAT, and the NAT type of the NAT device 6 is one of Port-Restricted Cone NAT and Symmetric NAT.
(9) The NAT type of the NAT device 7 is Port-Restricted Cone NAT and the NAT type of the NAT device 6 is Symmetric NAT.

In a case where one of the above-described conditions (8) and (9) is satisfied and also the change pattern of port mapping on the terminal device 9 and the terminal device 10 can be predicted, it is determined that UDP multi-hole punching is possible (yes at step S33), and UDP multi-hole punching is selected as the start-up procedure. Communication is performed based on UDP multi-hole punching (step S35) and P2P communication is thus made possible between the terminal device 9 and the terminal device 10. In a state where P2P communication is possible, video image data are transmitted and received between the terminal device 9 and the terminal device 10 (step S27). The CPU 81 advances to the processing at step S37 shown in FIG. 7. When the above conditions are not satisfied (no at step S33), the CPU 81 advances immediately to the processing at step S37 shown in FIG. 7.

Figure 7:
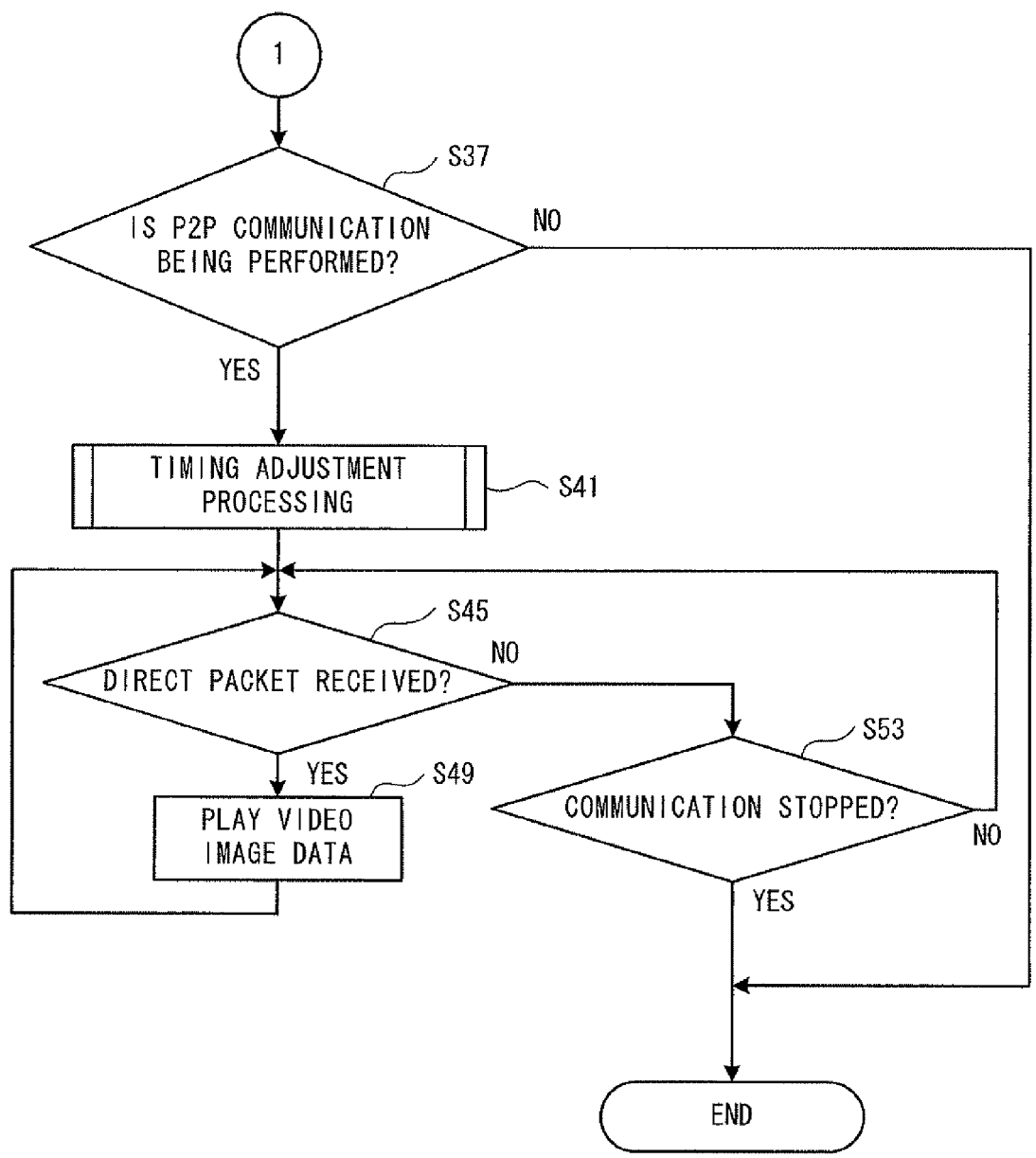
FIG. 7 is a flowchart showing the terminal device processing and is a continuation of FIG. 6.
Figure 8:
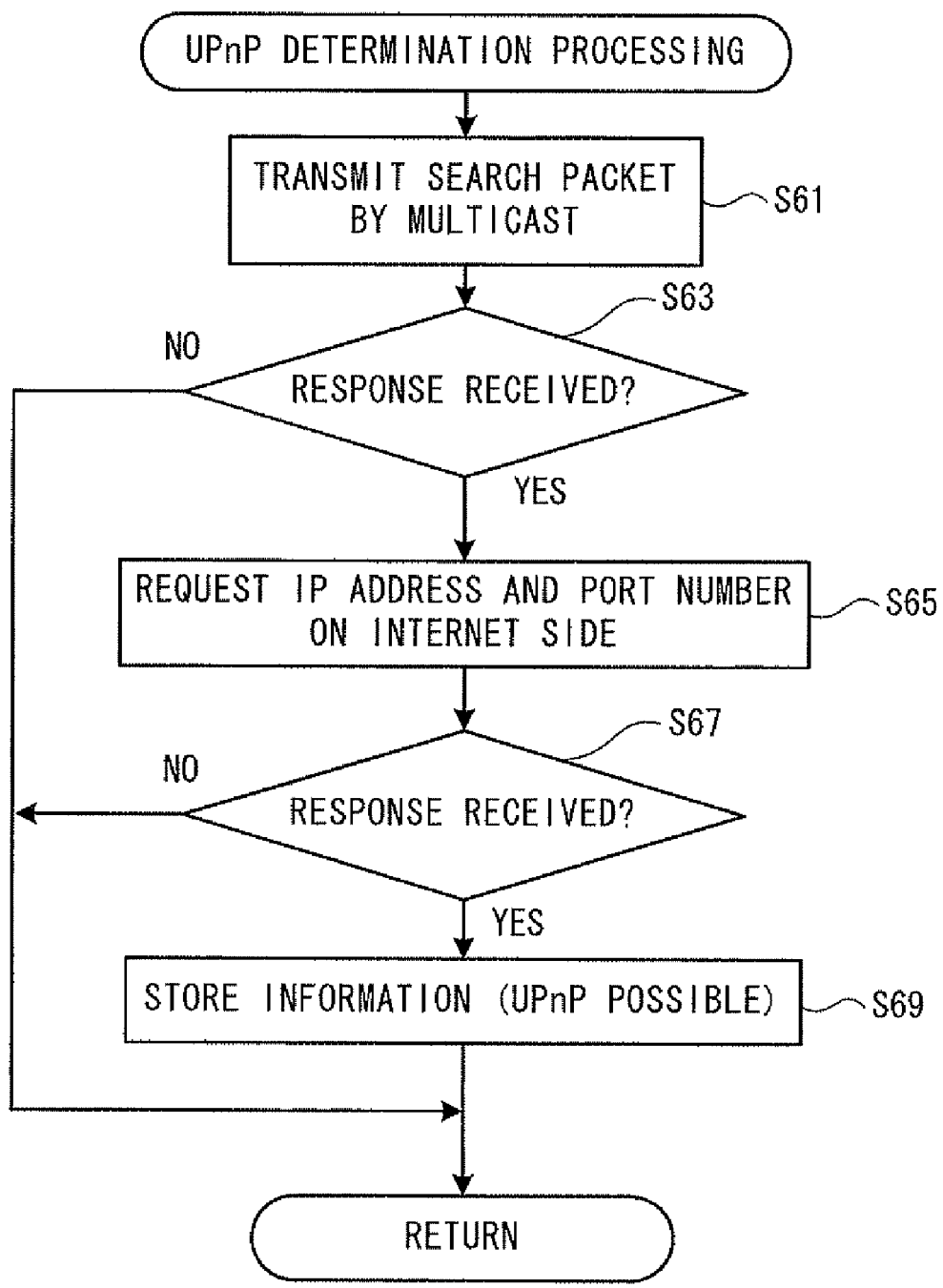
FIG. 8 is a flowchart showing Universal Plug and Play (UPnP) determination processing.

In the processing at step S37 shown in FIG. 7, a determination is made as to whether P2P communication has been started between the terminal device 9 and the terminal device 10 through the processing at step S27 shown in FIG. 6 (step S37). For example, in a case where it has been determined that P2P communication is not possible at step S83 of the NAT type determination processing shown in FIG. 9, P2P communication is not performed (no at step S37). In this case, the CPU 81 cannot stop tunneling communication via the HTTP server 4, and thus terminates the terminal device processing in that state. In a case where P2P communication is being performed (yes at step S37), in order to switch from tunneling communication via the HTTP server 4 to P2P communication, the CPU 81 performs timing adjustment processing (step S41).

The timing adjustment processing will be explained with reference to FIG. 12 to FIG. 14. A determination is made as to whether a packet has been received from the terminal device 10 by tunneling communication via the HTTP server 4 (step S131). Hereinafter, the packet received by tunneling communication via the HTTP server 4 will be referred to as an "HTTP packet." In a case where the HTTP packet has been received (yes at step S131), a packet number of the received packet is stored in the RAM 23 as a variable nH (step S133). The packet number is a number that is sequentially added to the packets. The variable nH is a variable to manage a most recent packet number among the packet numbers of the HTTP packets. The CPU 81 causes the display 861 to display video image data included in the received HTTP packet to play the video image data (step S135). A user can view the video image data on the display 861. The packet number (nH) of the HTTP packet that is the basis of the video image data that is being played is stored in the RAM 23 as a variable nT. The variable nT is a variable to manage the packet number of the packet that is the basis of the video image data that has been played last. The CPU 81 returns to the processing at step S131.

In a case where the HTTP packet has not been received (no at step S131), a determination is made as to whether a packet has been received from the terminal device 10 by P2P communication (step S137). Hereinafter, the packet received from the terminal device 10 by P2P communication will be referred to as a "direct packet" In a case where the direct packet has not been received (no at step S137), the CPU 81 returns to the processing at step S131. In a case where the direct packet has been received (yes at step S137), a packet number of the direct packet is stored in the RAM 23 as a variable nD (step S139). The variable nD is a variable to manage a most recent packet number among the packet numbers of the direct packets.

Processing is performed to switch a packet from which the video image data to be played is extracted (hereinafter sometimes referred to as a "packet to be played") from the HTTP packet to the direct packet (step S141 to step S145).

Values of the variable nH and the variable nD are compared (step S141). In a case where the variable nD is larger than the variable nH (yes at step S141), it indicates that the direct packet has reached the terminal device 9 in advance of the HTTP packet. In this case, first synchronizing processing (step S143) is performed. In the first synchronizing processing, the packet to be played is switched from the HTTP packet to the direct packet. In a case where the variable nD is equal to or smaller than the variable nH (no at step S141), it indicates that the HTTP packet has reached the terminal device 9 in advance of the direct packet. In this case, second synchronizing processing (step S145) is performed. In the second synchronizing processing, the communication is continued as it is until the direct packet reaches the terminal device 9 in advance of the HTTP packet, and following that, the packet to be played is switched from the HTTP packet to the direct packet. Following one of the first synchronizing processing and the second synchronizing processing, the CPU 81 terminates the timing adjustment processing and returns to the terminal device processing shown in FIG. 7.

Figure 12:
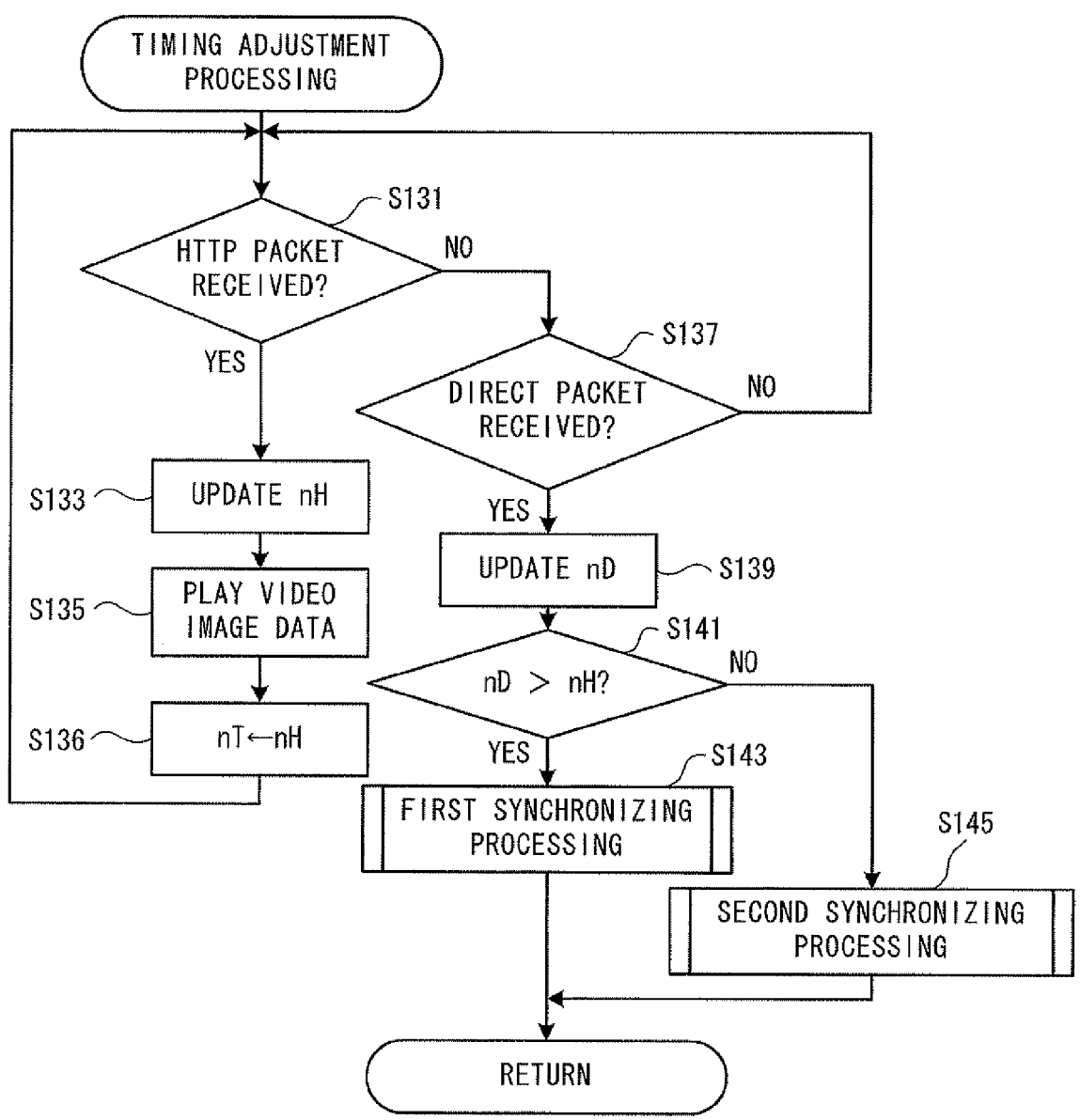
FIG. 12 is a flowchart showing timing adjustment processing.
Figure 13:
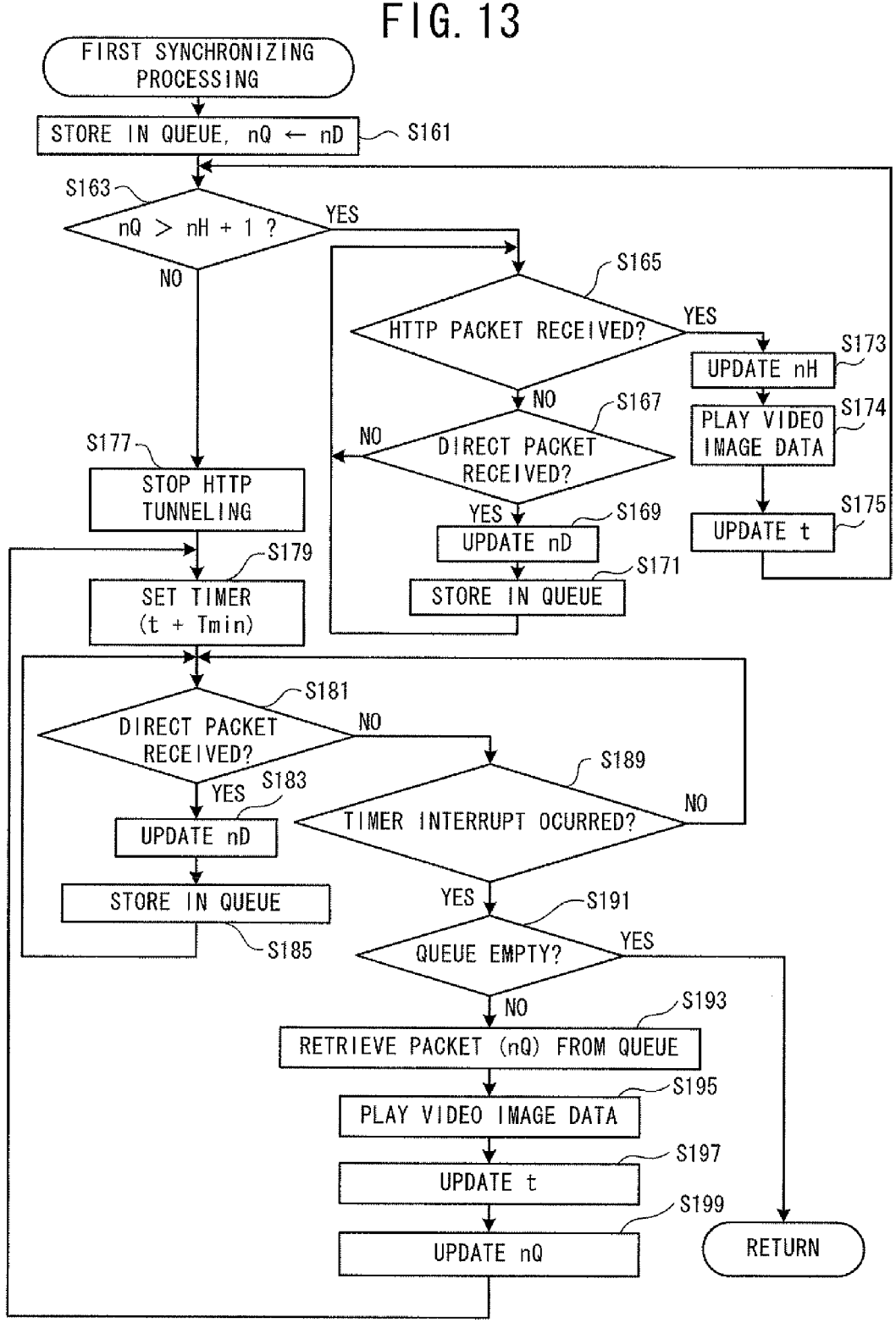
FIG. 13 is a flowchart showing first synchronizing processing.

As shown in FIG. 13, in the first synchronizing processing, the direct packet received at step S137 shown in FIG. 12 is stored at the end of a queue prepared in the HDD 24. The packet number of the received direct packet (nD) is stored in the RAM 23 as a variable nQ (step S161). The variable nQ is a variable that indicates the packet number of the packet stored at the head of the queue, namely, the packet number of the packet to be first extracted from the queue.

A determination is made as to whether the variable nQ is larger than a value (nH+1) obtained by adding 1 to the variable nH (step S163). In a case where the variable nQ is larger than the value nH+1 (yes at step S163), the direct packet cannot be used as the packet to be played. Thus, a determination is made as to whether the HTTP packet has been newly received (step S165). In a case where the HTTP packet has been received (yes at step S165), the packet number of the HTTP packet is stored as the variable nH (step S173). The video image data included in the received HTTP packet are played, and displayed on the display 861 (step S174). A time at which the video image data are displayed is stored in the RAM 23 as a variable t that indicates a time at which the video image data are displayed (step S175). The CPU 81 returns to the processing at step S163 and repeatedly performs the above-described processing.

In a case where the HTTP packet has not been received (no at step S165), a determination is made as to whether the direct packet has been received (step S167). When the direct packet has not been received (no at step S167), the CPU 81 returns to the processing at step S165 and continues to monitor reception of the HTTP packet and the direct packet. In a case where the direct packet has been received (yes at step S167), the packet number of the direct packet is stored as the variable nD (step S169). The received direct packet is stored at the end of the queue (step S171). The CPU 81 returns to the processing at step S165 and repeatedly performs the above-described processing.

In a case where the above-described processing is repeated, the variable nH is updated, and the variable nQ becomes equal to or less than the value nH+1 (no at step S163), the direct packet, not the HTTP packet, can be used as the packet to be played. Thus, tunneling communication via the HTTP server 4 is stopped (step S177).

A display interval Tmin is added to the variable t. As Tmin, a minimum interval may be used that will not cause the user to feel strangeness viewing the video image data when they are intermittently displayed on the display 861. A timer interrupt is set, using the calculated value (t+Tmin) as a timer interrupt time period (step S179). The timer interrupt occurs when the time t+Tmin is reached. After that, the timer interrupt occurs periodically at each Tmin interval.

In a state in which the timer interrupt is set, a determination is made as to whether the direct packet has been received (step S181). In a case where the direct packet has been received (yes at step S181), the packet number of the direct packet is stored as the variable nD (step S183). The received direct packet is stored at the end of the queue (step S185). The CPU 81 returns to the processing at step S181 and repeatedly performs the above-described processing.

In a case where the direct packet has not been received (no at step S181), a determination is made as to whether the timer interrupt set in the processing at step S179 has occurred (step S189). If the timer interrupt has not occurred (no at step S189), the CPU 81 returns to the processing at step S181, and repeatedly performs the above-described processing. If the timer interrupt has occurred (yes at step S189), a determination is made as to whether the queue is empty (step S191). In a case where there are no direct packets stored in the queue and the queue is empty (yes at step S191), there are no direct packets that can be displayed on the display 861. Thus, the CPU 81 terminates the first synchronizing processing and returns to the timing adjustment processing shown in FIG. 12.

In a case where a direct packet is stored in the queue and the queue is not empty (no at step S191), the direct packet that has the packet number nQ is retrieved (step S193). The video image data included in the retrieved direct packet are played and displayed on the display 861 (step S195). The display time is stored as the variable t (step S197). The variable nQ is updated by adding 1 (step S199). The CPU 81 returns to step S179 and repeatedly performs the above-described processing.

Figure 14:
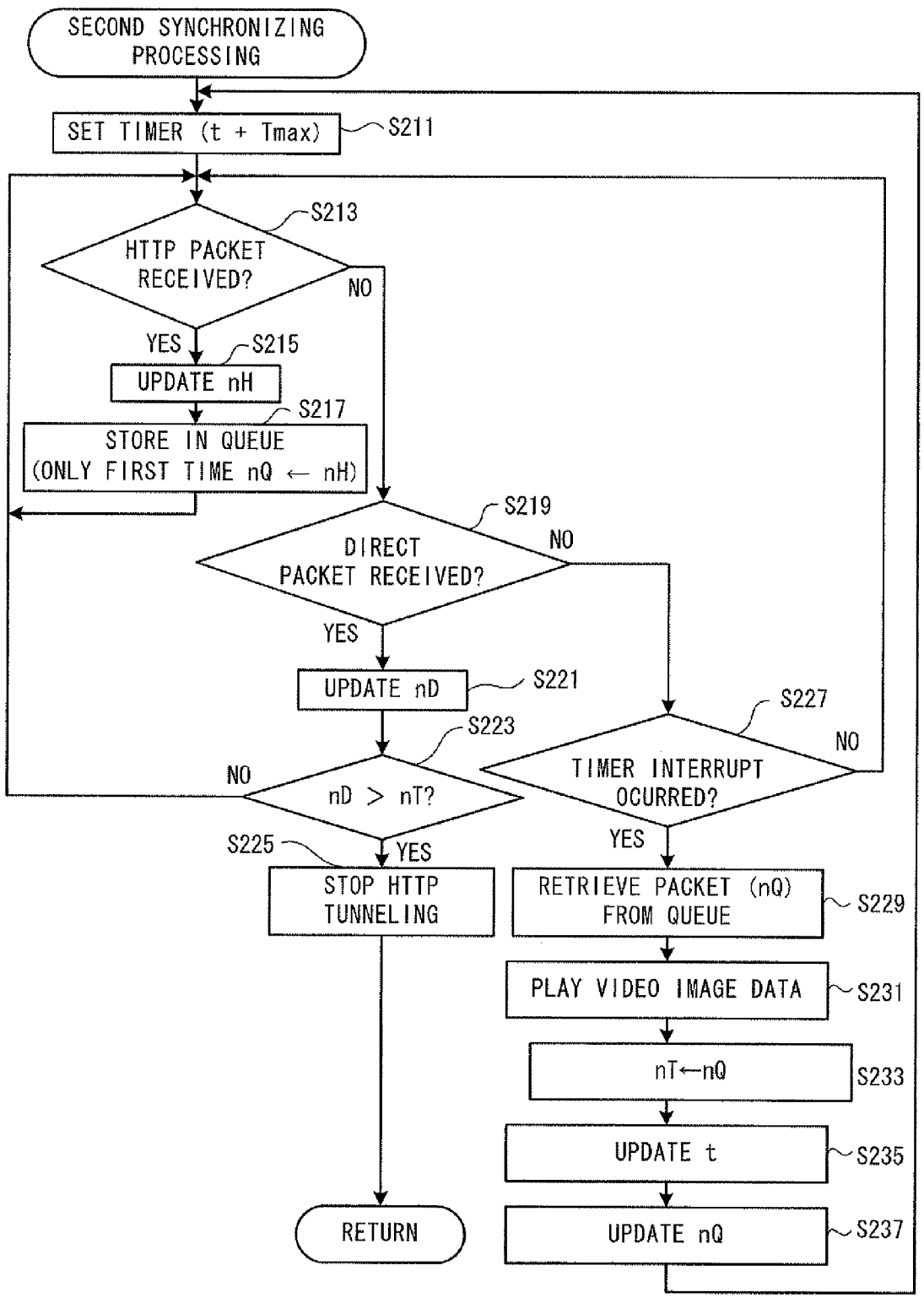
FIG. 14 is a flowchart showing second synchronizing processing.

As shown in FIG. 14, in the second synchronizing processing, a display interval Tmax is added to the variable t that indicates a time at which the video image data are displayed. As Tmax, a maximum interval may be used that will not cause the user to feel strangeness viewing the video image data when they are continuously displayed on the display 861. A timer interrupt is set, using the calculated value (t+Tmax) as a timer interrupt time period (step S211). The timer interrupt occurs when the time t+Tmax is reached. After that, the timer interrupt occurs periodically at each Tmax interval.

In a state in which the timer interrupt is set, a determination is made as to whether the HTTP packet has been received (step S213). In a case where the HTTP packet has been received (yes at step S213), the packet number of the HTTP packet is stored as the variable nH (step S215). The received HTTP packet is stored at the end of a queue prepared in the HDD 24. The packet number of the HTTP packet is stored as the variable nQ (step S217). The CPU 81 returns to the processing at step S213 and repeatedly monitors reception of the HTTP packet.

In a case where the HTTP packet has not been received (no at step S213), a determination is made as to whether the direct packet has been received (step S219). In a case where the direct packet has been received (yes at step S219), the packet number of the direct packet is stored as the variable nD (step S221). The variable nD and the variable nT are compared (step S223). In a case where the variable nD is equal to or less than the variable nT (no at step S223), the direct packet cannot be used as the packet to be played. Thus, the CPU 81 returns to the processing at step S213 and continuously monitors reception of the HTTP packet.

In a case where the variable nD is larger than the variable nT (yes at step S223), the direct packet, not the HTTP packet, can be used as the packet to be played. Thus, tunneling communication via the HTTP server 4 is stopped (step S225). The CPU 81 terminates the second synchronizing processing and returns to the timing adjustment processing shown in FIG. 12.

In a case where the direct packet has not been received (no at step S219), a determination is made as to whether the timer interrupt set in the processing at step S211 has occurred (step S227). If the timer interrupt has not occurred (no at step S227), the CPU 81 returns to the processing at step S213, and repeatedly performs the above-described processing. If the timer interrupt has occurred (yes at step S227), of the HTTP packets stored in the queue, the HTTP packet that has the packet number nQ is retrieved (step S229). The video image data included in the retrieved HTTP packet are played, and displayed on the display 861 (step S231). The packet number (nQ) of the displayed HTTP packet is stored as the variable nT (step S233), and the display time is stored as the variable t (step S235). The variable nQ is updated by adding 1 (step S237). The CPU 81 returns to the processing at step S211 and repeatedly performs the above-described processing.

As shown in FIG. 7, after one of the first synchronizing processing shown in FIG. 13 and the second synchronizing processing shown in FIG. 14 is terminated, and further, after the timing adjustment processing shown in FIG. 12 is terminated, in the terminal device processing, a determination is made as to whether the direct packet has been received (step S45). As tunneling communication via the HTTP server 4 has already been stopped, the HTTP packet will not be received. In a case where the direct packet has been received (yes at step S45), the video image data included in the direct packet are played and displayed on the display 861 (step S49). The CPU 81 returns to step S45 and continues to monitor reception of the direct packet. In a case where the direct packet has not been received (no at step S45), a determination is made as to whether an operation has been performed by the user with the keyboard 851 to stop communication with the terminal device 10 (step S53). In a case where the operation has not been performed (no at step S53), the CPU 81 returns to the processing at step S45 and continuously monitors reception of the direct packet. In a case where the operation has been performed to stop the communication (yes at step S53), the communication between the terminal device 9 and the terminal device 10 is stopped and the terminal device processing is terminated.

Figure 15:
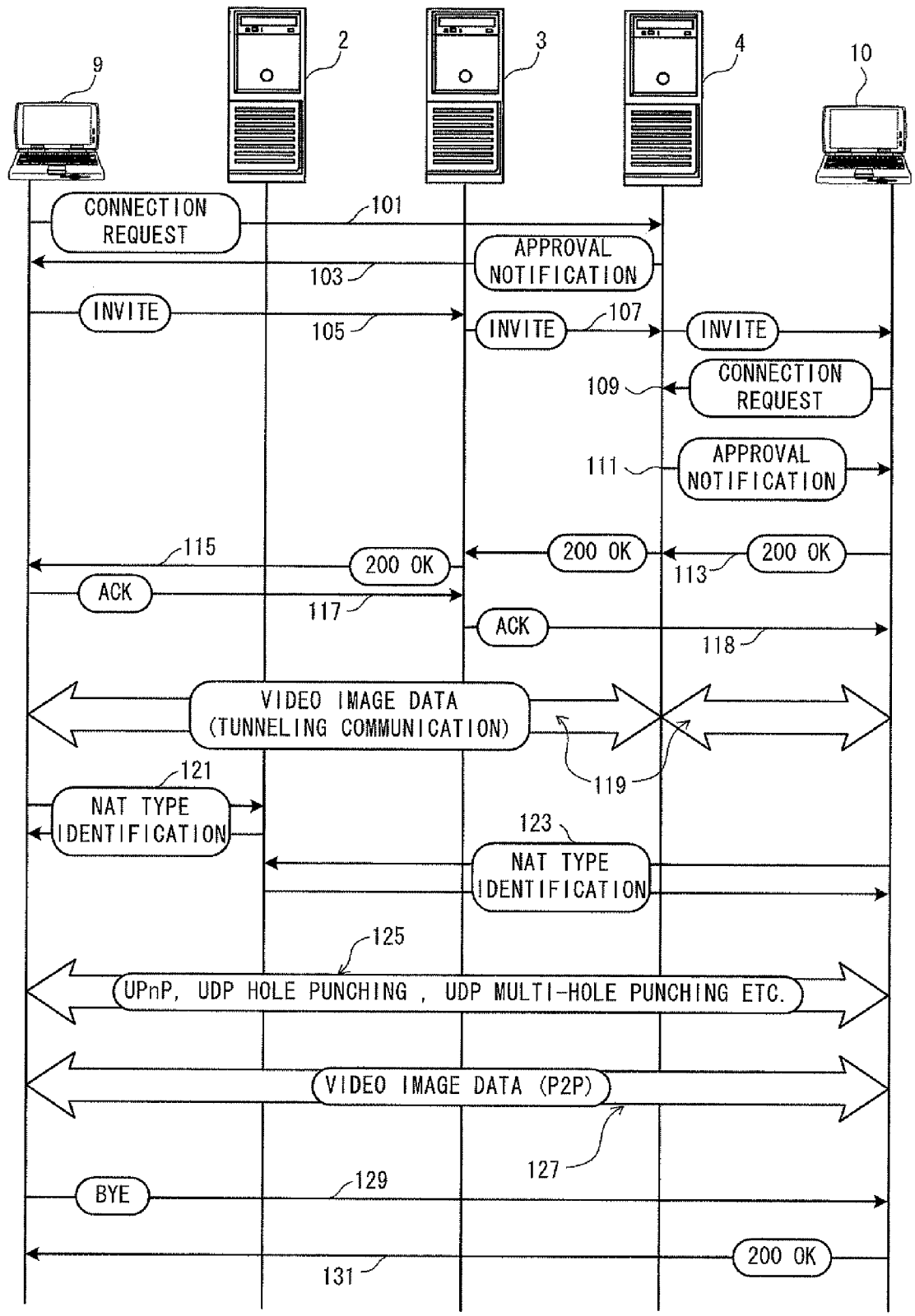
FIG. 15 is a sequence diagram showing communication between a terminal device 9 and a terminal device 10.

A communication sequence in the communication system 1 will be explained with reference to FIG. 15. Note that, in FIG. 15, the NAT devices 6 and 7 are omitted.

To cause tunneling communication via the HTTP server 4 to be started between the terminal device 9 and the terminal device 10, the terminal device 9 transmits a connection request packet to the HTTP server 4 (101). The HTTP server 4 returns to the terminal device 9 an approval notification packet, which notifies the terminal device 9 that tunneling communication is approved (103). In order to establish a SIP-based session with the terminal device 10, the terminal device 9 transmits a connection request packet (INVITE) to the SIP server 3 (105). The SIP server 3 forwards the connection request packet (INVITE) to the terminal device 10 (107). Communication of the connection request packet (INVITE) via the SIP server 3 is performed by tunneling communication via the HTTP server 4.

In order to start tunneling communication via the HTTP server 4, the terminal device 10, which has received the connection request packet (INVITE) via the SIP server 3 and the HTTP server 4, transmits a connection request packet to the HTTP server 4 (109). The HTTP server 4 returns an approval notification packet to the terminal device 10 (111).

In order to establish the SIP-based session with the terminal device 9, the terminal device 10 transmits a connection response packet (200 OK) to the SIP server 3 (113). The SIP server 3 forwards the connection response packet (200 OK) to the terminal device 9 (115). In response to the connection response packet (200 OK), the terminal device 9 transmits an ACK packet (117). The ACK packet reaches the terminal device 10 via the SIP server 3 (118). Communication of the connection response packet (200 OK) and the ACK packet via the SIP server 3 is performed by tunneling communication via the HTTP server 4. A state is achieved in which tunneling communication via the HTTP server 4 is possible between the terminal device 9 and the terminal device 10 (step S11 in FIG. 6). A session is established by SIP-based communication, and the terminal device 9 and the terminal device 10 are in a connected state.

Communication of packets including video image data is performed between the terminal device 9 and the terminal device 10 (119; step S13 in FIG. 6). On the terminal device 9, the video image data included in the received HTTP packet are displayed on the display 861 (step S174 in FIG. 13, and step S231 in FIG. 14).

In the state in which tunneling communication is performed, processing is started to perform P2P communication between the terminal device 9 and the terminal device 10. A determination is made as to whether the NAT device 6 and the NAT device 7 are equipped with UPnP functions (step S15 in FIG. 6). By communication with the STUN server 2, the NAT types of the NAT device 6 and of the NAT device 7 are identified (121, 123; step S19 and step S23 in FIG. 6). Based on whether or not the NAT devices 8 are equipped with UPnP functions and on the NAT types, communication of the start-up procedure necessary to perform P2P communication is selected (step S17, step S21, step S25, step S29 and step S33 in FIG. 6). Based on the selected start-up procedure, communication is performed between the terminal device 9 and the terminal device 10 and P2P communication becomes possible (125; step S31 and step S33 in FIG. 6). By P2P communication, communication of the packets including the video image data is performed between the terminal device 9 and the terminal device 10 (127; step S27 in FIG. 6).

After P2P communication has been started, at a predetermined timing, tunneling communication via the HTTP server 4 is terminated (step S177 in FIG. 13, and step S225 in FIG. 14). As a result, the packet to be played is switched from the HTTP packet to the direct packet (step S41 in FIG. 7), and the video image data included in the direct packet are extracted and displayed on the display 861 (step S195 in FIG. 13, and step S49 in FIG. 7).

When a command to terminate communication is input via the keyboard 851 of the terminal device 9, the terminal device 9 transmits a communication end packet (BYE) to the terminal device 10 in order to terminate the communication (129). When the terminal device 10 receives the communication end packet (BYE), it returns a response packet (200 OK) to the terminal device 9 (131). Communication between the terminal device 9 and the terminal device 10 is terminated (step S53 in FIG. 7).

Figure 16:
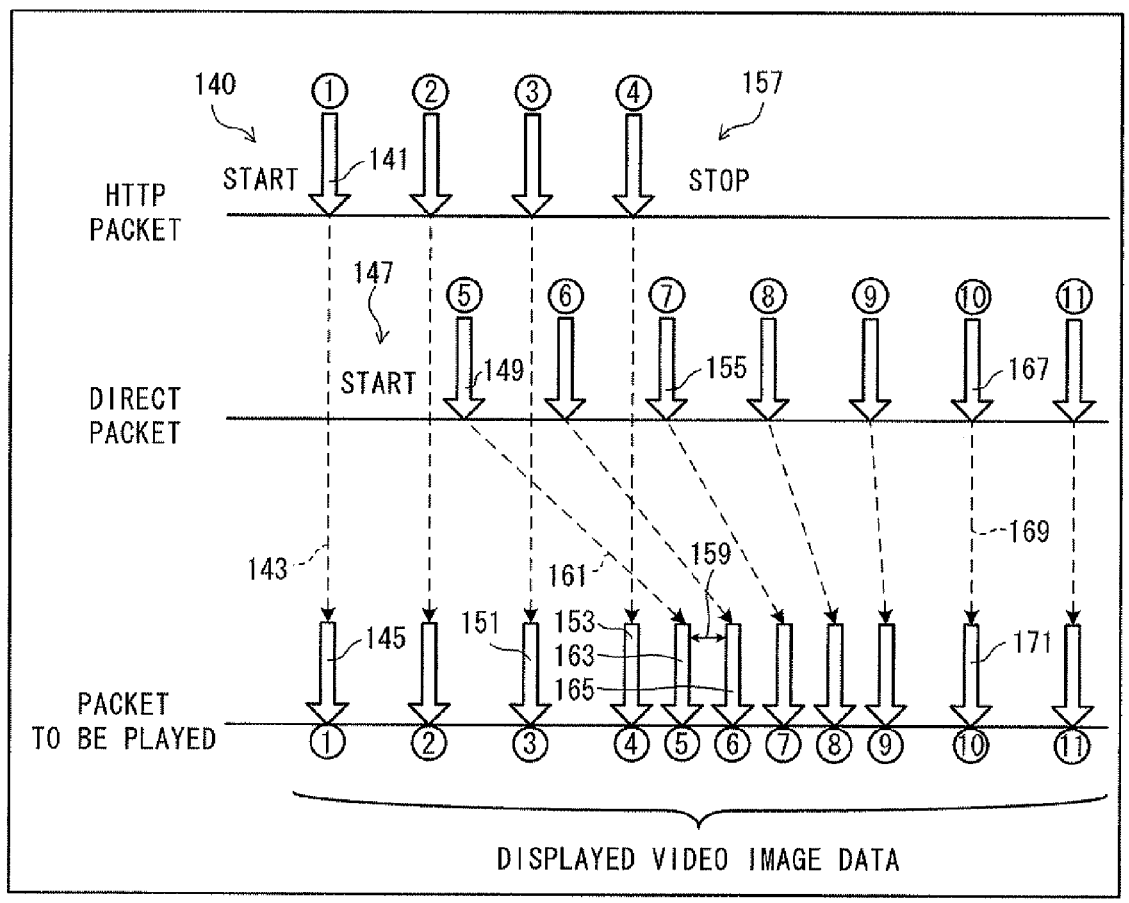
FIG. 16 is an explanatory diagram of display timing of video image data in the first synchronizing processing.
Figure 17:
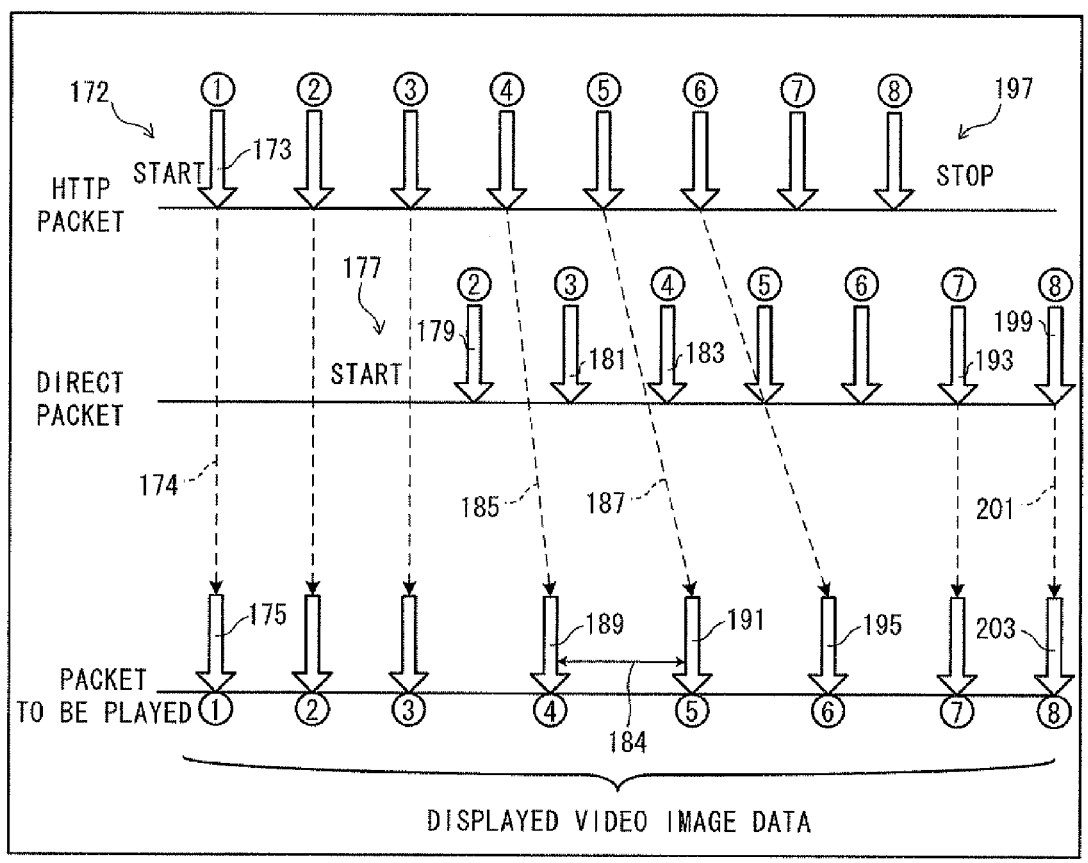
FIG. 17 is an explanatory diagram of display timing of video image data in the second synchronizing processing.

Display timings of video image data in the first synchronizing processing and the second synchronizing processing will be explained with reference to FIG. 16 and FIG. 17. FIG. 16 and FIG. 17 respectively show reception timings on the terminal device 9 of the packets (the HTTP packets and the direct packets) transmitted from the terminal device 10 and also show timings of display on the display 861 of the video image data included in the packets to be played.

As shown in FIG. 16, tunneling communication via the HTTP server 4 is started (140), and the HTTP packet is received (141; step S131 in FIG. 12). The HTTP packet is used as the packet to be played (143), and the video image data included in the packet to be played are displayed on the display 861 (145; step S135 in FIG. 12).

As a result of communication performed based on the specific start-up procedure, P2P communication becomes possible and P2P communication is started (147). The direct packet is received (149; step S137 in FIG. 12). The packet number of the direct packet is "5" and the packet number of the packet to be played at this time point is "2" (yes at step S141 in FIG. 12). Therefore, the first synchronizing processing (step S143 in FIG. 12) is performed. The direct packet is stored in the queue (step S161 in FIG. 13). The variable nQ (=5) is larger than the value nH+1 (=3) (yes at step S163 in FIG. 12), and thus the HTTP packet with the packet number "3" is used as the packet to be played and the video image data are displayed (151; step S174 in FIG. 13). The direct packet with the packet number "6" is stored in the queue (step S171 in FIG. 13).

When the HTTP packet with the packet number "4" is used as the packet to be played and the video image data are displayed (153; step S174 in FIG. 13), the variable nQ (=5) becomes equal to the value nH+1 (=5) (no at step S163 in FIG. 13). Therefore, the tunneling communication is stopped (157; step S177 in FIG. 13). The direct packet with the packet number "7" is then received (155) and stored in the queue (step S185 in FIG. 13). The direct packet stored in the queue is retrieved at the predetermined interval (Tmin, 159) (161; step S193 in FIG. 13). The retrieved direct packet is used as the packet to be played and the video image data are displayed (163, 165; step S195 in FIG. 13).

When the processing advances and there are no more direct packets stored in the queue (yes at step S191 in FIG. 13), the video image data are extracted from the direct packet (169) at a timing at which the direct packet is received (167) and displayed (171; step S49 in FIG. 7).

As described above, even when the packet to be played is switched from the HTTP packet to the direct packet, the shortest display interval of the video image data is Tmin. Thus, it is possible to switch to a state in which the direct packet is used as the packet to be played without causing the user to feel strangeness when viewing the video image due to the display interval of the video image data being too short.

As shown in FIG. 17, tunneling communication via the HTTP server 4 is started and the HTTP packet is received (172, 173; step S131 in FIG. 12). The HTTP packet is used as the packet to be played (174), and the video image data included in the packet to be played are displayed on the display 861 (175; step S135 in FIG. 12).

As a result of communication based on the specific start-up procedure, P2P communication becomes possible and P2P communication is started (177). The direct packet is received (179; step S137 in FIG. 12). The packet number of the direct packet is "2" and the packet number of the packet to be played at this time point is "3" (no at step S141 in FIG. 12). Therefore, the second synchronizing processing (step S145 in FIG. 12) is performed. When the HTTP packet has been received (yes at step S213 in FIG. 14), the HTTP packet is stored in the queue (step S217 in FIG. 14).

When the direct packets with the packet numbers "3" and "4" are received (181, 183; yes at step S219 in FIG. 14), the packet numbers "3" and "4" are both equal to or less than the packet number "4" of the packet to be played (no at step S223 in FIG. 14) and tunneling communication is therefore not terminated. The HTTP packet stored in the queue is retrieved at the predetermined interval (Tmax, 184) (185, 187; step S229 in FIG. 14). The retrieved HTTP packet is used as the packet to be played, and the video image data are displayed (189, 191; step S231 in FIG. 14).

When the direct packet with the packet number "7" is received (193) and the packet number of the direct packet becomes larger than the packet number "6" of the packet to be played at this time point (195) (yes at step S223 in FIG. 14), tunneling communication is stopped (197; step S225 in FIG. 14). Following that, the video image data are extracted at a timing at which the direct packet is received (201). The extracted video image data are displayed (203; step S49 in FIG. 7).

In the manner described above, even when the packet to be played is switched from the HTTP packet to the direct packet, the longest display interval of the video image data is Tmax. Thus, it is possible to switch to a state in which the direct packet is used as the packet to be played without causing the user to feel strangeness when viewing the video image due to the display interval of the video image data being too long.

As described in the above explanation, in the communication system 1, until P2P communication is started between the terminal device 9 and the terminal device 10, tunneling communication via the HTTP server 4 is performed. For that reason, it is possible to reduce the time required until communication is started between the terminal device 9 and the terminal device 10. After communication based on the specific start-up procedure is performed, tunneling communication is switched to P2P communication. For that reason, communication delays that are likely to occur in tunneling communication can be suppressed. Thus the terminal device 9 can receive and output the packets transmitted from the terminal device 10 without any delay.

Around the time at which tunneling communication between the terminal device 9 and the terminal device 10 is stopped and switched to P2P communication, the timing to display video image data on the display 861 is adjusted. More specifically, the display interval of the video image data is adjusted such that it does not become smaller than Tmin and does not become larger than Tmax. In a case where throughput significantly differs between tunneling communication and P2P communication, the timings of arrival of the packets on the terminal device 9 side may be different between the HTTP packet and the direct packet. However, in the present embodiment, by adjusting the display timing of the video image data, an impact on a display state caused by differences in the arrival timings can be suppressed. As a result, the user can view the video image data without feeling strangeness.

Terminal device processing according to a modified example of the above-described embodiment will be explained with reference to FIG. 18. In the modified example, when P2P communication can be performed with the terminal device 10 without going through a start-up procedure, tunneling communication via the HTTP server 4 is not performed. Processing other than the terminal device processing is the same as in the above-described embodiment, and a further explanation is therefore omitted here. Furthermore, an explanation will be simplified or omitted of parts of the terminal device processing that are the same as the above-described embodiment.

As shown in FIG. 18, when the terminal device processing is started, a determination is made as to whether UPnP-based communication can be performed between the terminal device 9 and the terminal device 10 (step S15). In a case where UPnP-based communication is possible (yes at step S17), communication based on a specific start-up procedure is not necessary. Therefore, Video image data are then transmitted and received between the terminal device 9 and the terminal device 10 by P2P communication (step S27).

In a case where UPnP-based communication between the terminal device 9 and the terminal device 10 cannot be performed (no at step S17), processing is performed to determine the NAT type of the NAT device 6 (step S19). Based on the NAT type of the NAT device 6, a determination is made as to whether communication based on a specific start-up procedure is required to perform P2P communication (step S21). In a case where communication based on the specific start-up procedure is not necessary (no at step S21), video image data is transmitted and received between the terminal device 9 and the terminal device 10 by P2P communication (step S27).

In a case where communication based on the specific start-up procedure is necessary (yes at step S21), communication is performed in order for tunneling communication via the HTTP server 4 to be started between the terminal device 9 and the terminal device 10 (step S251). In a state in which tunneling communication is possible, the transmission and reception of packets between the terminal device 9 and the terminal device 10 is started (step S253). The type of the NAT device 7 (the partner NAT device) is acquired (step S23), and, based on the NAT types of the NAT device 6 and of the NAT device 7, a determination is made as to whether communication based on a specific start-up procedure is necessary (step S25, step S29 and step S33). As necessary, after the communication based on the specific start-up procedure is performed (step S31 and step S35), video image data are transmitted and received between the terminal device 9 and the terminal device 10 by P2P communication (step S27).

As described above, in the modified example, based on the NAT type of the NAT device 6, the determination is made as to whether communication based on the specific start-up procedure is necessary. When it is determined that communication based on the specific start-up procedure is not necessary, tunneling communication via the HTTP server 4 is not performed, and P2P communication is performed. Thus, the terminal device 9 can promptly start P2P communication with the terminal device 10 without occurrence of communication delays that are likely to occur at a time of tunneling communication.

The present invention is not limited to the above embodiment and modified example, and various modifications can be made. For example, in the present embodiment, tunneling communication is realized by HTTP encapsulation of the packets by the HTTP server 4. However, other general tunneling communication technology may be used. For example, tunneling communication may be realized by using Secure SHell (SSH) to encapsulate the packets.

In the embodiment, after establishing the session between the terminal device 9 and the terminal device 10 by communication control of the SIP server 3, the packets are transmitted and received between the terminal device 9 and the terminal device 10. However, communication based on another communication protocol, such as the File Transfer Protocol (FTP) etc. may be performed under the tunneling communication.

In the modified example, it is determined whether or not communication based on a specific start-up procedure is necessary depending on the NAT type of the NAT device 6. However, it may be determined whether communication based on the specific start-up procedure is necessary depending on the NAT type of the NAT device 7, or depending on the NAT types of the NAT devices 6 and 7.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A terminal device that is connected to an internal network, which is under control of a NAT device connected to an external network, and that is capable of communicating with another terminal device that is connected to another internal network, which is under control of another NAT device that is different to the NAT device, the terminal device comprising:

a first communication portion that performs tunneling communication with the other terminal device via a server that is connected to the external network, the server being adapted to realize tunneling communication between the terminal device and the other terminal device by encapsulating and decapsulating packets based on a communication protocol by which the NAT device can transfer the packets;

an identification portion that identifies, by communication with a management server that is connected to the external network, type information of at least one of the NAT device and the other NAT device, the type information being classified by a port mapping method;

a selection portion that selects, based on the type information identified by the identification portion, from a procedure list stored in storage portion, a start-up procedure that is necessary to start peer to peer (P2P) communication between the terminal device and the other terminal device via the NAT device and the other NAT device;

a switching portion that performs communication based on the start-up procedure selected by the selection portion and starts the P2P communication with the other terminal device, and then switches from the tunneling communication to the P2P communication by terminating the tunneling communication being performed by the first communication portion; and a second communication portion that performs the P2P communication with the other terminal device after switching from the tunneling communication to the P2P communication by the switching portion.

2. The terminal device according to claim 1, wherein the identification portion identifies the type information of at least one of the NAT device and the other NAT device by communication with the management server, in a state in which the tunneling communication is being performed by the first communication portion.

3. The terminal device according to claim 1, further comprising:

a determination portion that determines, based on the type information identified by the identification portion, whether it is possible to start the P2P communication with the other terminal device without performing the communication based on the start-up procedure;

wherein, the identification portion identifies the type information of at least one of the NAT device and the other NAT device by communication with the management server, before the tunneling communication by the first communication portion is started, and the first communication portion, in a case where the determination portion determines that it is not possible to start the P2P communication with the other terminal device without performing the communication based on the start-up procedure, performs the tunneling communication with the other terminal device.

4. The terminal device according to claim 3, further comprising:

a third communication portion that, in a case where the determination portion determines that it is possible to start the P2P communication with the other terminal device without performing the communication based on the start-up procedure, performs the P2P communication with the other terminal device.

5. The terminal device according to claim 1, further comprising:

an output portion that is adapted to output at least one of data included in a first packet and data included in a second packet, the first packet being a packet received from the other terminal device by the tunneling communication, and the second packet being a packet received from the other terminal device by the P2P communication; and an output control portion that causes the output portion to output the data included in the first packet in a state before the tunneling communication is switched to the P2P communication by the switching portion, and that causes the output portion to output the data included in the second packet in a state after the tunneling communication is switched to the P2P communication by the switching portion;

wherein, the output control portion, in a case where the second packet is in advance of the first packet at a start time point of the P2P communication, causes the output portion to output the data included in the second packet at a first predetermined interval, and, in a case where the first packet is in advance of the second packet, causes the output portion to output the data included in the first packet to the output portion at a second predetermined interval, the second predetermined interval being longer than the first predetermined interval.

6. A communication method of performing communication between a terminal device that is connected to an internal network, which is under control of a NAT device connected to an external network, and another terminal device that is connected to another internal network, which is under control of another NAT device that is different to the NAT device, the communication method comprising the steps of:

performing tunneling communication with the other terminal device via a server that is connected to the external network, the server being adapted to realize tunneling communication between the terminal device and the other terminal device by encapsulating and decapsulating packets based on a communication protocol by which the NAT device can transfer the packets;

identifying, by communication with a management server that is connected to the external network, type information of at least one of the NAT device and the other NAT device, the type information being classified by a port mapping method;

selecting, based on the identified type information, from a procedure list stored in a storage portion, a start-up procedure that is necessary to start peer to peer (P2P) communication between the terminal device and the other terminal device via the NAT device and the other NAT device;

performing communication based on the selected start-up procedure and starting the P2P communication with the other terminal device, and then switching from the tunneling communication to the P2P communication by terminating the tunneling communication; and performing the P2P communication with the other terminal device after switching from the tunneling communication to the P2P communication.

7. The communication method according to claim 6, wherein the type information of at least one of the NAT device and the other NAT device is identified by communication with the management server, in a state in which the tunneling communication is being performed.

8. The communication method according to claim 6, further comprising the step of:

determining, based on the identified type information, whether it is possible to start the P2P communication with the other terminal device without performing the communication based on the start-up procedure;

wherein, the type information of at least one of the NAT device and the other NAT device is identified by communication with the management server, before the tunneling communication is started, and in a case where it is determined that it is not possible to start the P2P communication with the other terminal device without performing the communication based on the start-up procedure, the tunneling communication is performed with the other terminal device.

9. The communication method according to claim 8, further comprising the step of:

performing the P2P communication with the other terminal device, in a case where it is determined that it is possible to start the P2P communication without performing the communication based on the start-up procedure.

10. The communication method according to claim 6, further comprising the steps of:
in a state before switching from the tunneling communication to the P2P communication, causing an output portion to output data included in a first packet, the first packet being a packet received from the other terminal device by the tunneling communication; and
in a state after switching from the tunneling communication to the P2P communication, in a case where a second packet is in advance of the first packet at a start time point of the P2P communication, causing the output portion to output data included in the second packet at a first predetermined interval, and, in a case where the first packet is in advance of the second packet, causing the output portion to output the data included in the first packet at a second predetermined interval that is longer than the first predetermined interval, the second packet being a packet received from the other terminal device by the P2P communication.

11. A non-transitory computer-readable medium storing a communication program for performing communication between a terminal device that is connected to an internal network, which is under control of a NAT device connected to an external network and another terminal device that is connected to another internal network, which is under control of another NAT device that is different to the NAT device, the communication program comprising instructions that cause a controller of the terminal device to perform the steps of:
performing tunneling communication with the other terminal device via a server that is connected to the external network, the server being adapted to realize tunneling communication between the terminal device and the other terminal device by encapsulating and decapsulating packets based on a communication protocol by which the NAT device can transfer the packets;
identifying, by communication with a management server that is connected to the external network, type information of at least one of the NAT device and the other NAT device, the type information being classified by a port mapping method;
selecting, based on the identified type information, from a procedure list stored in a storage portion, a start-up procedure that is necessary to start peer to peer (P2P) communication between the terminal device and the other terminal device via the NAT device and the other NAT device;
performing communication based on the selected start-up procedure and starting the P2P communication with the other terminal device, and then switching from the tunneling communication to the P2P communication by terminating the tunneling communication; and
performing the P2P communication with the other terminal device after switching from the tunneling communication to the P2P communication.

12. The non-transitory computer-readable medium according to claim 11, wherein the type information of at least one of the NAT device and the other NAT device is identified by communication with the management server, in a state in which the tunneling communication is being performed.

13. The non-transitory computer-readable medium according to claim 11, wherein:
the communication program further includes instructions that cause the controller to perform the step of determining, based on the identified type information, whether it is possible to start the P2P communication with the other terminal device without performing the communication based on the start-up procedure;
the type information of at least one of the NAT device and the other NAT device is identified by communication with the management server, before the tunneling communication is started; and
in a case where it is determined that it is not possible to start the P2P communication with the other terminal device without performing the communication based on the start-up procedure, the tunneling communication is performed with the other terminal device.

14. The non-transitory computer-readable medium according to claim 13, wherein the communication program further includes instructions that cause the controller to perform the step of performing the P2P communication with the other terminal device, in a case where it is determined that it is possible to start the P2P communication without performing the communication based on the start-up procedure.

15. The non-transitory computer-readable medium according to claim 11, wherein the communication program further includes instructions that cause the controller to perform the steps of:
in a state before switching from the tunneling communication to the P2P communication, causing an output portion to output data included in a first packet, the first packet being a packet received from the other terminal device by the tunneling communication; and
in a state after switching from the tunneling communication to the P2P communication, in a case where a second packet is in advance of the first packet at a start time point of the P2P communication, causing the output portion to output data included in the second packet at a first predetermined interval, and, in a case where the first packet is in advance of the second packet, causing the output portion to output the data included in the first packet at a second predetermined interval that is longer than the first predetermined interval, the second packet being a packet received from the other terminal device by the P2P communication.

* * * * *